United States Patent [19]

Nakayama et al.

[11] Patent Number: 5,208,912
[45] Date of Patent: May 4, 1993

[54] JOINT INFORMATION PROCESSING SYSTEM COMPRISING A PLURALITY OF TERMINAL APPARATUSES GUARANTEEING IDENTICALNESS OF DATA PROCESSING RESULTS

[75] Inventors: Yoshiyuki Nakayama, Yokohama; Kenjiro Mori, Machida; Tadashi Yamamitsu, Hadano, all of Japan

[73] Assignee: Hitachi, Ltd., Tokyo, Japan

[21] Appl. No.: 614,087

[22] Filed: Nov. 15, 1990

[30] Foreign Application Priority Data

Nov. 15, 1989 [JP] Japan ................... 1-294983

[51] Int. Cl.$^5$ ........................................... G06F 15/16
[52] U.S. Cl. ................................. 395/200; 395/650; 395/800; 364/284.4
[58] Field of Search ............... 384/200, 600; 395/800, 395/200; 364/283.3, 283.4, 284.4

[56] References Cited

U.S. PATENT DOCUMENTS

| | | | |
|---|---|---|---|
| 4,414,621 | 11/1983 | Bowen et al. | 364/200 |
| 4,531,184 | 7/1985 | Wigan et al. | 364/200 |
| 4,654,483 | 3/1987 | Imai et al. | 379/54 |
| 4,656,654 | 4/1987 | Dumas | 379/96 |
| 4,714,989 | 12/1987 | Billings | 364/200 |

OTHER PUBLICATIONS

Computer-Based Real-Time Conferencing Systems, S. Sarin & I. Greif, Oct. '85, IEEE Computer vol. 33 pp. 33-45.
Stefik et al., Beyond the Chalkboard: Computer Support for Collaboration and Problem Solving in Meetings, Jan. 87, Comm. of ACM, vol. 30, No. 1, pp. 32-47.

Primary Examiner—Dale M. Shaw
Assistant Examiner—Diane E. Smith
Attorney, Agent, or Firm—Antonelli, Terry, Stout & Kraus

[57] ABSTRACT

In a conferencing system including a plurality of workstations each having a multiwindow function connected to each other via a network, programs loaded in the respective workstations to control a conference are linked with each other through a logical circular control program's path. A data item inputted from a workstation not having a data effectuation floor qualification is transmitted as a data item in an ineffective state to a next workstation. When received by a workstation possessing the effectuation floor qualification, the data in the ineffective state is converted into an effective data. In each station, application programs and utility programs are responsive only to the data in the effective state, which guarantees the identity of results of data processing achieved in the respective workstations.

9 Claims, 20 Drawing Sheets

F I G. 4
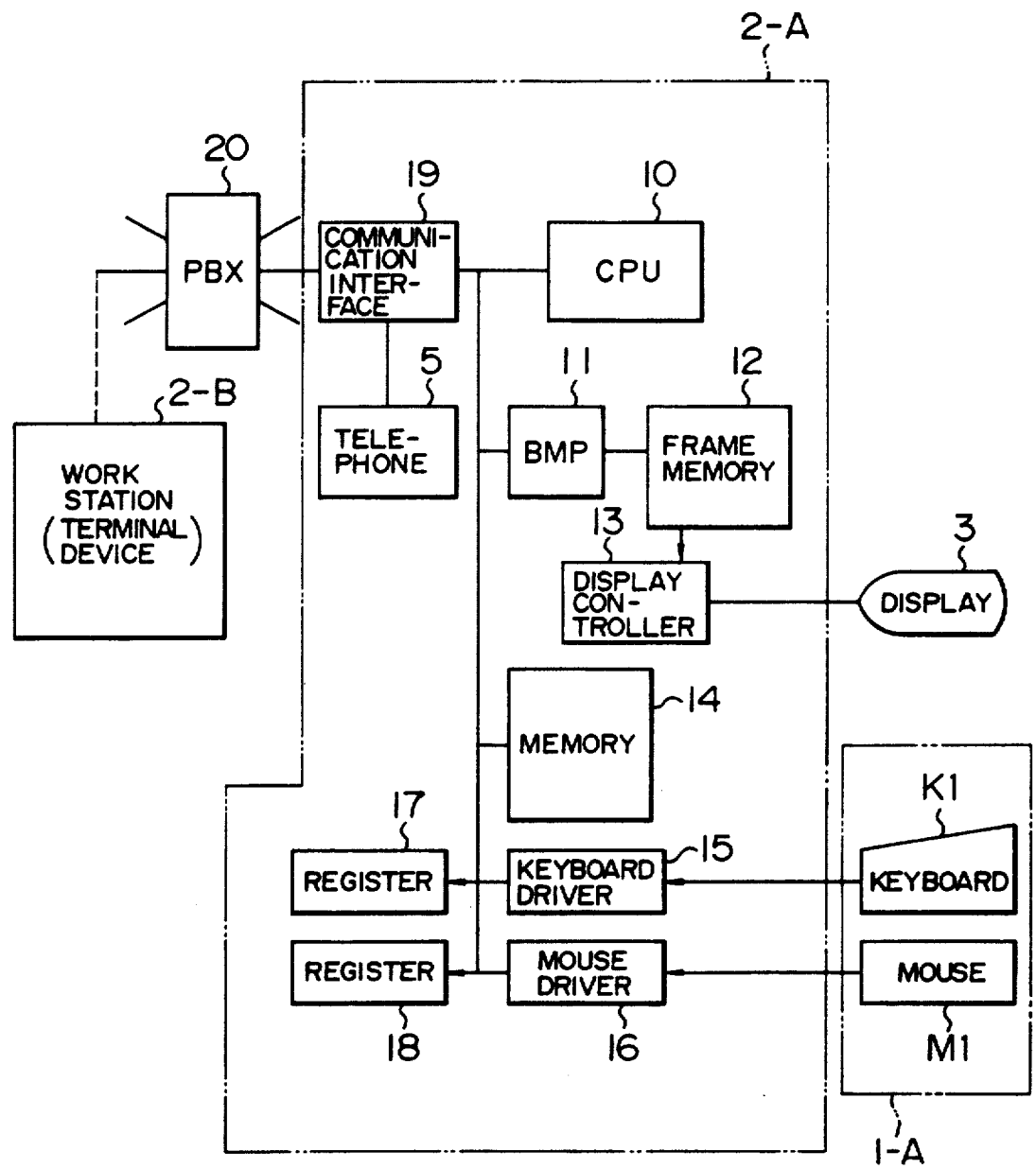

| RSCid \ APid | 1 | 2 | ------ | MAXAPS |
|---|---|---|---|---|
| 1 | "WINDOW" "FILE" | "WINDOW" "FILE" |  | IN-NO-USE |
| 2 | "WINDOW" "FILE" | IN-NO-USE |  | WIN(APid, RSCid) VUI(APid, RSCid) |
| ⋮ |  |  |  |  |
| MAX RSCS | IN-NO-USE |  |  | IN-NO-USE |

340

|   | A | B | C |
|---|---|---|---|
| $t_1$ | Y | | Z |
| $t_2$ | Y Z | Y | Z |
| $t_3$ | Y Z | Y Z | Z Y |

F I G. 15
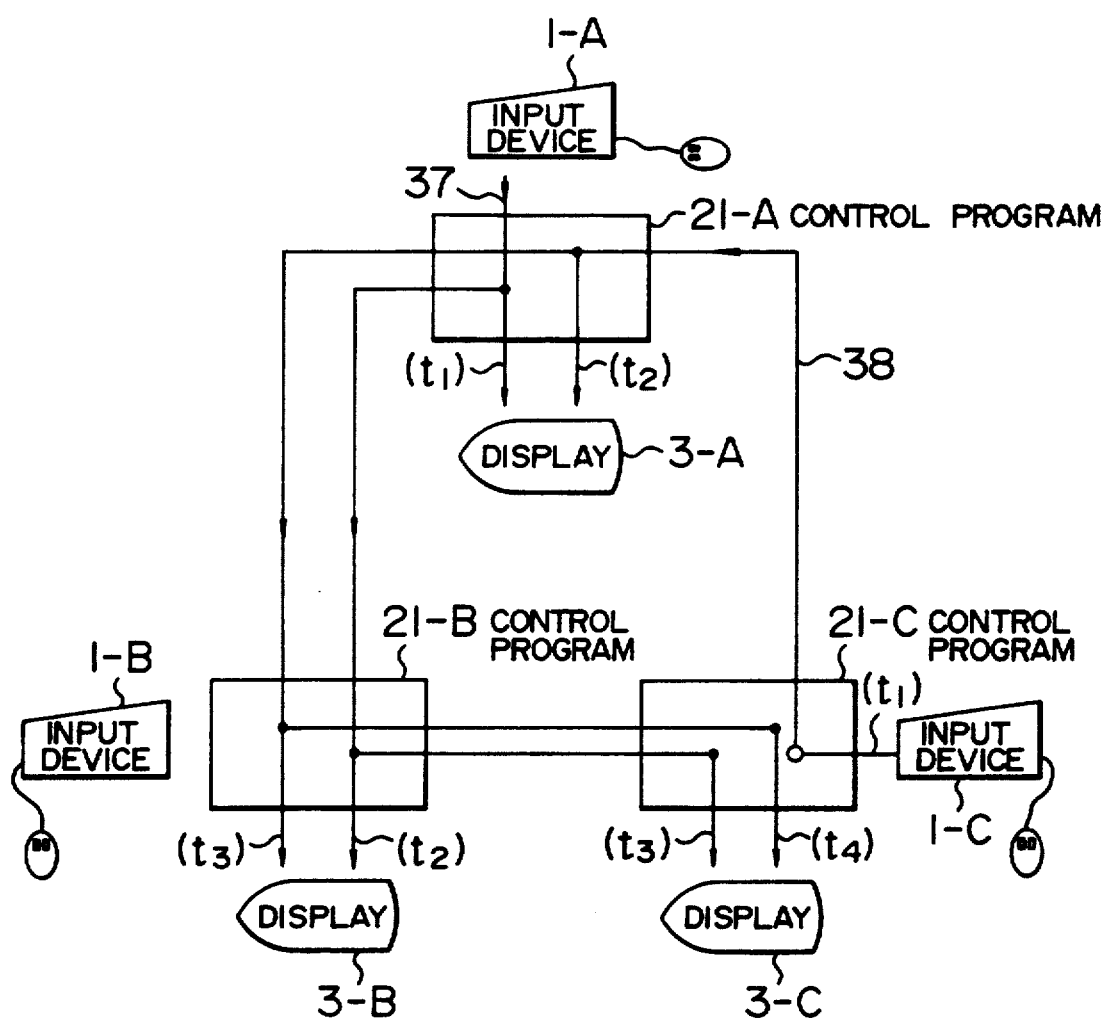

FIG. 16

|     | A   | B   | C   |
|-----|-----|-----|-----|
| t₁  | Y   |     |     |
| t₂  | Y Z | Y   |     |
| t₃  | Y Z | Y Z | Y   |
| t₄  | Y Z | Y Z | Y Z |

FIG. 17

| ORIG | EFF | REACH | APid | RSCid | DATA |
|------|-----|-------|------|-------|------|

| APid \ RSCid | 1 | 2 | ------ | MAXAPS |
|---|---|---|---|---|
| 1 | 1 | ○ |   | ○ |
| 2 | ○ | 1 |   |   |
| ⋮ |   |   |   | EFF(APid, RSCid) |
| MAX RSCS | 1 |   |   | ○ |

46

| APid / RSCid | 1 | 2 | ------- | MAXAPS | 46 |
|---|---|---|---|---|---|
| 1 | 0 | 2 | | IN-NO-USE | |
| 2 | 4 | IN-NO-USE | | IN-NO-USE | |
| ⋮ | | | EFF(APid, RSCid) | | |
| MAX RSCS | IN-NO-USE | IN-NO-USE | | IN-NO-USE | |

FIG. 28

| APid / RSCid | 1 | 2 | ------- | MAXAPS |
|---|---|---|---|---|
| 1 | FORBIDDEN | 2 | | IN-NO-USE |
| 2 | FORBIDDEN | IN-NO-USE | | IN-NO-USE |
| ⋮ | | | EFF(APid, RSCid) | |
| MAX RSCS | FORBIDDEN | IN-NO-USE | | IN-NO-USE |

46

JOINT INFORMATION PROCESSING SYSTEM COMPRISING A PLURALITY OF TERMINAL APPARATUSES GUARANTEEING IDENTICALNESS OF DATA PROCESSING RESULTS

CROSS-REFERENCE TO RELATED APPLICATION

The present application relates to a U.S. patent application Ser. No. 350,850 entitled "Joint Information Processing System Including Plural Terminals", filed by Y. Nakayama, K. Mori, K. Takaragi and S. Domen on May 12, 1989, which application is assigned to the present assignee, and the contents of which are incorporated herein by reference.

BACKGROUND OF THE INVENTION

1. Field of the Invention

The present invention relates to a joint information processing system including a plurality of terminal stations, and in particular, to an information processing system in which a plurality of terminal apparatuses, such as microcomputers and workstations each having a display, are linked with each other through a communication network, such that users of the respective terminal apparatuses reference an identical display screen image displayed on the associated displays to accomplish jobs, for example, to edit documents, to participate in conferences, and to conduct conversations.

2. Description of the Related Art

An information system including a plurality of terminal apparatuses connected to each other via a communication line, and in which a data item or a command inputted from a terminal apparatus is transmitted to the other terminal apparatuses so as to change the output screen image of each terminal in response to the data item or command, is particularly useful as a conference or conversation system in which the users of the respective terminal apparatuses reference electronic data to conduct jobs also by using data attained through audio communications via a telephone line.

In the information processing system, a result of data processing achieved on a data item or an operation command supplied from one of participants of a conference or meeting (or conversation) is required to be equally reflected onto all participants (terminal apparatuses). In each terminal apparatus, data items inputted from an input device thereof and data items which are produced in the other terminals and which are received therefrom via a communication line are processed in a reception order of the data items. In this situation, when the data input operations take place in plural terminal apparatuses substantially at the same time, the order in which the produced data items are received varies between terminal apparatuses, which may possibly lead to a mismatch or inconsistency of data processing results and display contents between the terminal apparatuses.

Heretofore, as a method of solving the problem described above, there has been known a method described, for example, in the JP-A-63-1139, JP-A-63-37732, and JP-A-63-37733, in which one of a plurality of participants (subscriber terminals) of a conference or meeting is explicitly elected to be a chairman such that only the participant selected to be the chairman or only a participant approved by the chairman is allowed to conduct operations for data input, processing, and outputting of jobs. Furthermore, there has also been known a method as described, for example, in JP-A-64-54837 in which two terminals are alternately assigned a command transmission right or a token such that one of the terminals having the command transmission right (operation right or floor qualification) is allowed to achieve data operations for inputting, processing, and transmitting data.

In the method of the conventional technology in which the elected chairman approves the operations as described above, an inconsistency can be prevented from taking place between the participants. However, the participants cannot freely operate the respective terminal apparatuses, namely, the approval of the chairman is needed, which leads to a problem that the conference cannot be efficiently conducted. Moreover, in the prior art in which two terminals are alternately assigned the transmission right or a token, the method is limitatively applicable to a case including only two participants (terminals). Namely, considerations have not been given to a conference of three or more participants in which the operation right or the floor qualification is to be assigned to an appropriate person. Furthermore, this method is attended with a problem that the command transmission right or the token is required to be exchanged for each data input operation.

SUMMARY OF THE INVENTION

It is therefore an object of the present invention to provide a joint information processing method and a joint information processing system, including a plurality of terminal apparatuses linked with each other via a communication network, in which input operations accomplished from the respective terminal apparatuses in a random manner are equally reflected onto the terminal apparatuses.

Another object of the present invention is to provide a joint information processing method and a joint information processing system, including a plurality of terminal apparatuses linked with each other via a communication network, in which the response efficiency with respect to a screen image change in reply to operations conducted by the users from the respective terminal apparatuses is improved to guarantee integrity or correspondence of the data processing results in the respective terminal apparatuses.

In order to achieve the objects identified above, there is provided a joint information processing system according to the present invention in which an input data item (to be simply referred to as an input data item including an input command) supplied from a user takes an effective state or an ineffective state. An input data item in the effective state denotes a data item which may possibly be delivered to an object program (an interaction program or a utility program). An input data item in the ineffective state or status cannot be passed to an object program; consequently, there does not occur any data processing in response to the operator's action.

In this specification and the appended claims, a right to change an input data item from the ineffective state to the effective state is called a "effectuation floor qualification".

The effectuation floor is assigned to one of a plurality of terminal apparatuses constituting a conference system or joint information processing system. When a user inputs a data item from a terminal apparatus not assigned with the effectuation floor qualification, the input data item is initially set to the ineffective state. In consequence, the input data is not processed by an associated object program, and hence the display screen is not altered in response to the input data. Each terminal participating in a conference possesses a control program, which receives input data items supplied from an input device of the terminal ind input data items transmitted via a communication network from the other terminals. Of the received data items, only the data items in the effective state are selectively delivered to associated object programs by the control program.

A conferencing or conference system or a joint information processing system is configured by linking through a logical circular or ring communication path or a circular control program's path a plurality of control programs respectively existing in a plurality of terminals connected to each other via a communication network. The logical circular communication pith is formed through an operation in which a terminal transmits an input data item supplied from an input device thereof or received from another terminal to a control program of a specified terminal. For example, in a conference held for three terminals A, B, and C, when the terminals A, B, and C respectively send data to the terminals B, C, and A, a logical circular control program's path is established therebetween to connect these terminals to each other.

An input data item in the ineffective state sequentially passes the terminals through the logical circular communication path to reach a terminal having the effectuation floor qualification. In the terminal assigned with the effectuation floor qualification, the control program checks to determine whether or not the input data item supplied from an input device thereof or received from another terminal is in the ineffective state. If this is the case, the input data item is converted into an effective data item. The control program then delivers the effective data item to an object program in the terminal and transmits the effective data item via the control program's path to the next terminal.

In accordance with the present invention, as described above, when a data item inputted from one of a plurality of terminals is received by a particular control program assigned with the effectuation floor qualification, the data item is converted into an effective data item. In consequence, the effective data items thus produced are received in an identical order by the respective terminals, which guarantees the correspondence of the data processing results in all terminals.

In a case where each terminal operates in a multiwindow system and the users of the respective terminals hold a conference while referencing a plurality of windows of the associated terminals, the users' operations may occur in a simultaneous fashion from different windows. In this situation, effectuation of input data need only be independently accomplished for each window. Moreover, when users' operations take place in an identical window for different resources designated as objects of the operations, the effectuation control of the input data need only be conducted for each resource in an independent manner. In consequence, in order to achieve the objects of the present invention, the effectuation floor qualification may be independently assigned for each object program related to input data or for each resource as a processing object so as to distribute the effectuation floor qualification to a plurality of terminals (control programs).

In addition, the effectuation floor qualification is desirably moved between terminals depending on the status of terminal input operations so that the effectuation floor qualification is assigned to a terminal most frequently conducting an input operation. Such a transfer of the effectuation floor qualification may be accomplished, for example, as follows. That is, a control program currently assigned with the effectuation floor compares the number of data items of its terminal with that of data items received from the other terminals as to the data items effectuated under the effectuation floor qualification, to thereby transfer the effectuation floor qualification to another terminal when the number of effectuated data items associated with the other terminals is found to be greater.

The effectuation floor qualification adopted in the present invention can be clearly discriminated from the command transmission right or token (floor) employed in the conventional technology. This is because the transmission right of the prior art is an operation right assigned to only one of the plural terminals, namely, any other terminal can conduct such operations as the data input, processing, and transmission for a conference only after the transmission right is assigned thereto. In contrast thereto, the effectuation floor qualification is a right to convert an ineffective data item into an effective data item. Each user can input data from a terminal even when the effectuation floor qualification is not assigned to the terminal. When the data thus produced is returned to the original terminal via a terminal which processes the effectuation floor qualification, it is possible to execute processing on the data in the original terminal.

The foregoing and other objects, advantages, manner of operation, and novel features of the present invention will be understood from the following detailed description when read in connection with the accompanying drawings.

BRIEF DESCRIPTION OF THE DRAWINGS

FIG. 4 is a block diagram illustratively showing a constitution example of a processing system to implement a conferencing system according to the present invention;

FIG. 15 is a diagram showing an example of a flow of virtual input data between control programs when the effectiveness of input data is controlled;

FIG. 16 is a diagram showing an example of an input data reception order in a case where the effectiveness of input data is controlled;

FIG. 17 is a diagram showing a format of virtual input data in an embodiment according to the present invention;

FIG. 18 is a diagram showing an example of the structure of a virtual input data effectuation floor qualification control table;

FIG. 28 is a diagram showing an example of the configuration of an effectuation floor qualification control table capable of inhibiting a possession of the effectuation floor qualification.

DESCRIPTION OF THE PREFERRED EMBODIMENTS

Figure 1:
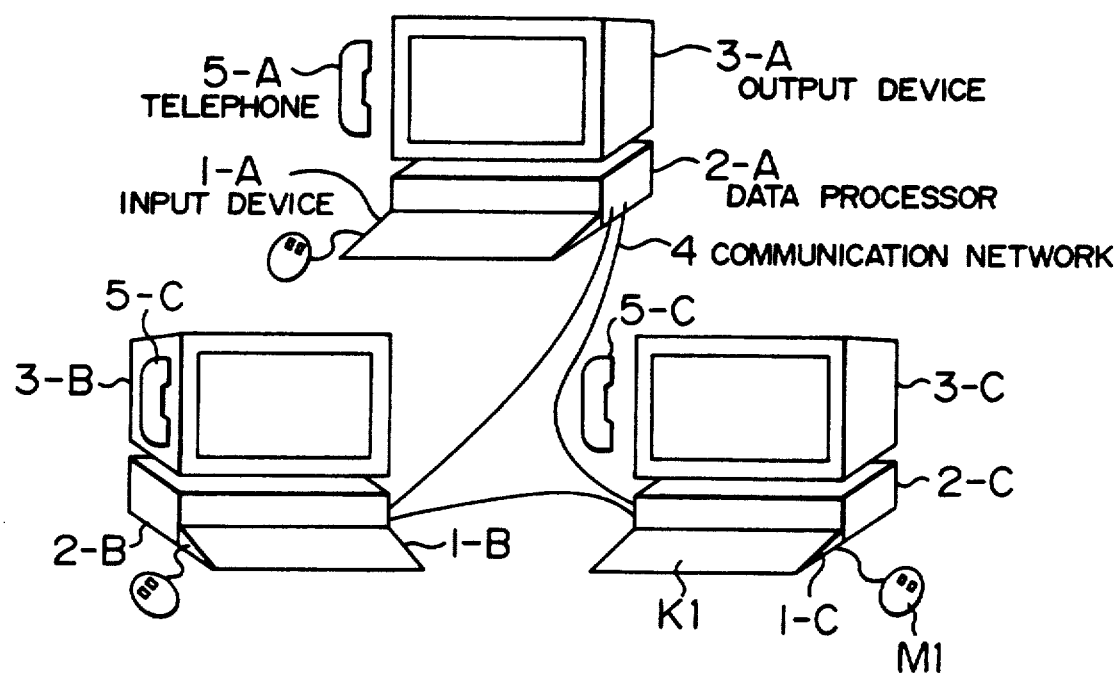
FIG. 1 is a schematic diagram showing an appearance of an example of a system in an embodiment according to the present invention.

FIG. 1 shows an appearance of a conferencing system including a plurality of workstations (terminal apparatuses) each having a telephone set in an embodiment according to the present invention. Each workstation comprises an input device 1 (1-A, 1-B, or 1-C) having a keyboard K1 and a mouse M1, a data processing system or processor 2 (2-A, 2-B, or 2-C) including a central processing unit (CPU) and a memory, and a display or output device 3 (3-A, 3-B, or 3-C) developing a multi-window display function. The data processor 2-A to 2-C are connected to each other via a communication network 4. Persons participating in a conference and operating the respective workstations can achieve audio or voice communications with each other by means of associated telephone sets 5 (5-A to 5-C). In consequence, a conference can be effected with multimedia information, such as character or graphic information items, presented on the respective display screens and the audio information items attained via the telephone sets 5. The input devices 1 each may additionally includes a joystick or a control lever and a tablet. The pointing devices, such as a mouse and a control lever, are used to indicate a position on a display and/or to specify selection objects in a displayed menu including several selection branches or items. In order to process multimedia information, the output devices 3 each may include a speaker if necessary. When an integrated services digital network (ISDN) capable of handling voice and data in an integrated manner is adopted as the communication network 4, there are attained various advantages with respect to the system facilities and charges in addition to an advantage that the data processors 2 can treat the telephone sets 5 in an integrated fashion. The system may be configured with a data communication network for data communications between the processors 2 and an audio network separately installed for telephone communications. Also in this case, the processors 2 may operate the telephone sets 5 in a limited range, for example, by adopting an RS-232C interface (one of the standards stipulated by the Electronics Industries Association (EIA)).

In the conferencing system according to the present invention, a plurality of workstations or computer systems are connected to each other. The users of the respective workstations or terminal apparatuses access audio or voice information via the telephone sets 5 and audio-visual information through operations from the various input devices 1. Moreover, the information items above are worked by the data processors 2 to conduct information processing, which has been impossible when only the voice information items are available.

Although a plurality of operators are allowed to use the conferencing system according to the present invention, the configuration of FIG. 1 shows a case where three persons participate in a conference with a workstation installed for each participant. The following description will be given of the case of three participants, which is applicable to general cases.

Figure 2:
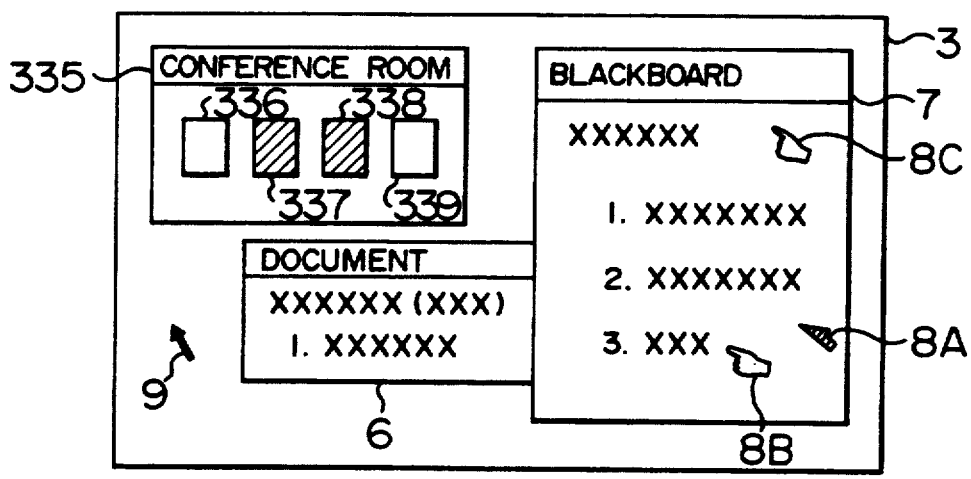
FIG. 2 is a diagram showing a typical screen image used in a conference held in a conferencing system to which the present invention is applied.

FIG. 2 shows a typical screen image which is reflecting a state of a conference and which is presented on the output devices 3 of the respective persons joining in the meeting. In this diagram, a conference room window 335 can be regarded as a cross section of the conference viewed from the participants. In this conferencing system, the workstations each can support jobs to be conducted only by the user of each workstation and jobs to be cooperatively achieved by the plural persons participating in the conference. For example, when a conference is held among three persons (workstations), the conference room window 335 is displayed on each workstation such that the windows 335 are interconnected to each other via the control program's path. As will be described later, the control program supervises operations to input a command in the conference room window 335 and to alter display contents thereof. When each workstation is loaded with a plurality of control programs, a plurality of conference room windows can be displayed on a display screen. Namely, the user can simultaneously join in a plurality of meetings. For example, a user participates in a first conference via a first conference room window 335 and in a second conference via a second conference room window 335, the second conference being held among a different combination of members as compared with the first conference.

In the conference room window 335, there are disposed resources such as materials and facilities (e.g. a blackboard) for the conference as well as personal memoranda and a telephone set. These items are displayed in a form of icons (pictorial characters) 336 to 339 presenting objects with relatively small symbolic images. An icon can be selected by a cursor 9 which is unique to each data processor 2 and which is moved in relation to an operation of the pointing device, namely, the mouse M1.

FIG. 2 shows a display state of a screen including a document window 6 presented by selecting a document icon 338 designating a conference material and a blackboard window 7 displayed through a selection of a blackboard icon 337 denoting a conference facility. An operation command executed for the conference room window 335 in a workstation is sequentially delivered to the other workstations via the communication network. In consequence, when the document window 6 and the blackboard window 7 are displayed in a workstation as shown in FIG. 2, the same image including the windows 6 and 7 is also presented in the other workstations participating in the conference. However, each user may arrange these windows as the conference resources at arbitrary positions on the display screen. When an operation is accomplished in the reference resource, window 6 or 7 in either one of the workstations, the operation is reflected onto the other workstations like in the case of the operation achieved in the reference room window 335. The users may modify or scroll a portion of the contents presented in the conference resource window 6 or 7. Each time the display contents of any one of the conference resource windows are altered, the same change takes place in the other stations.

In addition to the cursor 9, a pointing object (PO) 8 may be used to indicate a position in a conference resource window. In the screen image of FIG. 2, the blackboard window 7 contains three pointing objects 8A, 8B, and 8C corresponding to the conference participants A, B, and C, respectively. In the operation of a pointing object, a user moves the cursor 9 onto one of the pointing objects assigned to the user to shift the cursor 9 so as to move the pointing object to a desired position in a conference resource window. Data of the position of the pointing object in the window is also transmitted via the communication network to the other workstations. With this provision, for an explanation, the user may employ a pointing object to indicate a position on a screen image associated with the explanation. A pointing object is desirably displayed so as to be unique to each participant. In the image of FIG. 2, the pointing object 8A assigned to the operator of the pertinent terminal is different in shape and color from the other pointing objects 8B and 8C; moreover, the pointing object 8B is different only in shape from the pointing object 8C. In order to establish a correspondence between a pointing object and a participant, a name or initials may be added to the pointing object.

Figure 3:
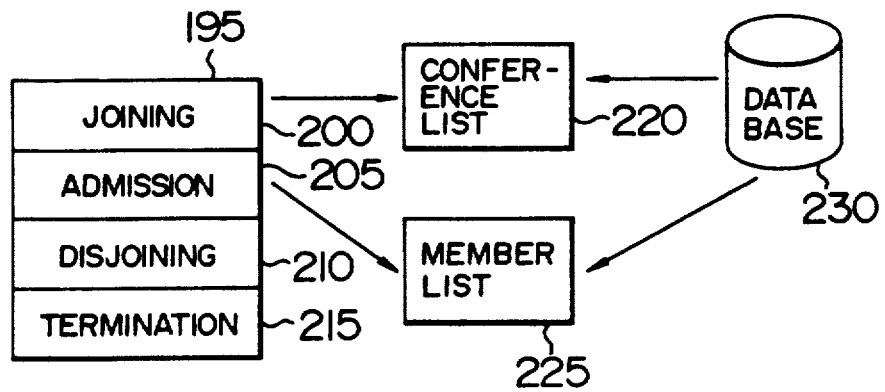
FIG. 3 is a diagram showing an example of a menu displaying commands to control a conference in a conferencing system according to the present invention.

FIG. 3 shows a menu 195 including conference execution commands employed to hold a conference and to change the configuration (e.g. the number of members) of the conference. The commands include a joining command 200, an admission command 205, a disjoining command 210, and a termination command 215. When the joining command 200 is selected, a conference list 220 is displayed on the screen. When a user selects from the displayed list 200 a conference in which the user desires to participate, a preparation for the conference participation is conducted. In a case where the admission item 205 is selected, a member list 225 is displayed. Persons capable of joining in the conference can be selected from the list 225 to allow the selected persons to participate in the conference in process. Namely, when a participant of the conference selects the admission 205, the persons desiring participation in the conference through the selection of the joining command 200 are allowed to participate in the conference, thereby increasing the number of the members of the conference. The conference list 220 and the member list 225 are prepared depending on information of a conference data base 230 storing therein data items related to various conferences. A participant desiring to disjoin from a conference selects the disjoining command 210 so as to thereafter disjoin therefrom. As a result, the number of members is decreased. When one of the members selects the termination command 215, the conference is terminated. When the disjoining command 210 or the termination command 215 is completely executed, the conference room window of any person disjoining from the conference presents an operation environment for a personal job.

FIG. 4 is a block diagram showing the basic configuration of a workstation implementing the present invention. The workstation comprises an input device 1A (K1, M1), a data processor 2-A, and an output device 3. A memory 14 is disposed to store therein various programs and data items and a central processing unit (CPU) 10 is employed to execute processing in accordance with instructions of a program read from the memory 14. In order to display an image onto the output device, the CPU 10 issues an instruction for the display to a bit map processor (BMP) 11, which in turn conducts a display operation. More concretely, the BMP 11 executes instructions from the CPU to control a frame memory 12 loaded with contents of screens in the form of image data. The contents of the frame memory 12 are fed to a display controller 13, which presents the received data onto the output device 3. A keyboard driver 15 is disposed to load a register 17 with codes supplied from a keyboard K1 as a component of the input device 1-A. A mouse driver 16 is used to receive codes supplied from a mouse M1 as a constituent element of the input device 1-A so as to store the codes in a register 18. In this embodiment, the communication unit between the workstations and the telephone sets is implemented by a private branch exchange (PBX) 20 supporting an integrated services digital network (ISDN) interface capable of processing communications of voices and data via a single line. Each workstation represented by the CPU 10 and each telephone 5 are connected via a communication interface unit 19 to the PBX 20 to communicate with respective partners via the PBX 20. However, as described above, it is possible for only the telephone set 5 to be connected to the PBX 20, in which case the workstations are linked with each other via another network, such as a local area network (LAN) or a packet switching facility.

Figure 5:
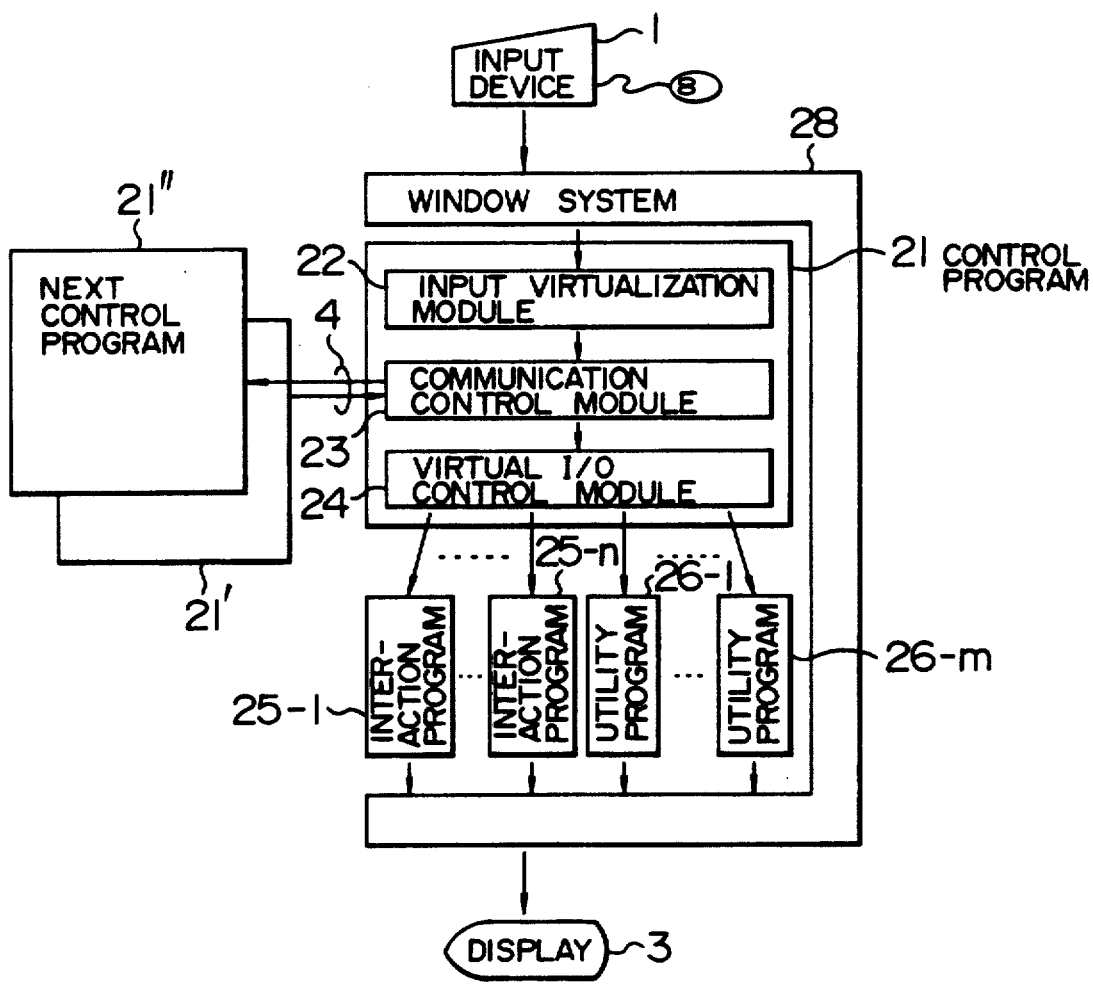
FIG. 5 is a diagram showing a configuration example of a software system materializing the present invention.

FIG. 5 shows the configuration of a software system loaded in each workstation for realizing a conferencing system. A window system 28 is adopted to interface programs stored in the processor 2 with the input device 1 and the output device 3. Each program receives via the window system 28 input data from the input device 1 to deliver a display instruction to the window system 28, which then causes the output device 3 to achieve a display operation of the data. A control program 21 is executed by the processor 2 to achieve processing for a conference. The control programs 21 stored in the respective processors 2-A to 2-C for an identical conference are linked with each other via the communication network 4 to cooperatively function to establish environments of the conference. Data items and other information items to be actually accessed by persons attending the conference are produced and displayed by interaction program or application programs 25 (25-1 to 25-n) and utility programs 26 (26-1 to 26-m). The interaction programs 25 include, for example, a document editing program, a table calculation program, and a blackboard program. In each workstation used in a conference, when an identical interaction program 25 cooperatively executes an identical operation under supervision of the associated control program 21, the same display image is presented to each participant of the conference. The utility programs 26 are adopted to facilitate usages of the interaction programs 26 in the joined operations. For example, a pointing object (PO) control program is useful to display a pointing object in a window being used by an interaction program 25. Namely, when using the PO control program, even if an existing program is adopted as an interaction program 25, an identical position can be similarly indicated in the adopted interaction program 25.

The control program 21 includes an input virtualization module 22, a communication control module 23, and a virtual I/O control module 24. Input data supplied by a participant from the input device 1 is fed via the window system 28 to the input virtualization module 22, which adds a header containing a participant identifier (ID) and the like to the received data to generate a virtual input in a data format for the conferencing system. With this provision, the input data may be adapted to any object programs in any conferencing systems. The virtual input data thus created by the input virtualization module 22 in passed to the communication control module 23. The communication control module 23 functions, in order to transfer input data generated at a position associated with a control program 21 to an interaction program 25 or a utility program 26 supervised under another control program 21, to communicate with said other control program 21. Moreover, the communication control module 23 serves to pass input data via the virtual I/O control module 24 to an interaction program 25 or a utility program 26 under control of its control program 21 related to the communication control module 23. The virtual I/O control module 24 passes the received virtual input data to an appropriate interaction or utility program 25 or 26, the data being in an original form or being restored in the input data format. Based on the input data received in the steps above, the interaction or utility program 25 or 26 conducts processing to reflect a processing result via the window system 28 onto the output device 3. There may be disposed a plurality of interaction and utility programs 25 and 26, respectively. In other words, in a conference using the conferencing system, a combination of functions can be executed in a parallel manner, for example, the functions of document editing and a table calculation or functions of a pointing object and a handwritten curve can be simultaneously carried out.

Figure 6:
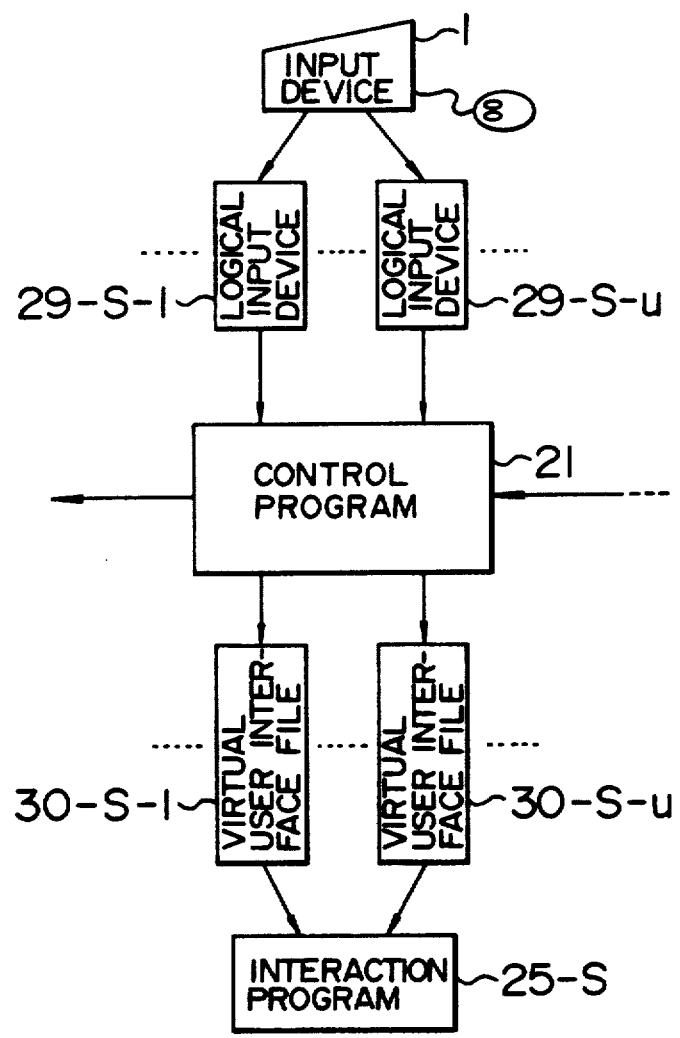
FIG. 6 is a diagram showing a correspondence relation between logical input devices and interaction-/utility programs.

FIG. 6 shows logical input devices 29 (29-s-1 to 29-s-u) to be represented by windows supported by the window system 28 and a method of appropriately delivering input data of the logical input devices 29 to interaction and utility programs 25 and 26. In a program, a window can be treated as a virtual input device (i.e. a logical input device 29). The window system 28, not shown in FIG. 6, supervises and controls the physical and logical input devices 1 and 29. This diagram shows a group of logical input devices 29 related to an interaction program 25-s selected from the interaction and utility programs 25 and 26 which may be used in the system. The interaction program 25-s treats logical input devices 29-s-1 to 29-s-u as the logical input devices 29. In accordance with the present invention, the input data items from the logical input devices 29 are first received by the control program 21, which sends the data items to the control programs 21 respectively loaded in the other workstations. On the other hand, the data items are passed to the interaction program 25-s. Modules constituting the control program 21 accomplishing these processing steps are substantially identical to those described in conjunction with FIG. 5. The control program 21 writes in virtual user interface files 30-s-x ($1 \leq X \leq u$) input data supplied from participants to the logical input devices 29-s-x ($1 \leq x \leq u$). The input data is actually read therefrom by the interaction program 25-s in association with the logical input devices. The interaction program 25-s processes the data read from the virtual user interface file 30-s-x as input data fed from the logical input device 29-s-x. As above, since a virtual user interface file 30 is provided for each window 29 to be paired therewith and a correspondence relation therebetween is controlled by the control program 21, the interaction and utility programs 25 and 26 become capable of accessing a plurality of logical input devices 29.

In this regard, for details about the functions of a workstation constituting the conferencing system, reference is to be made to the U.S. patent application Ser. No. 350,850 mentioned above.

Figures 7, 8:
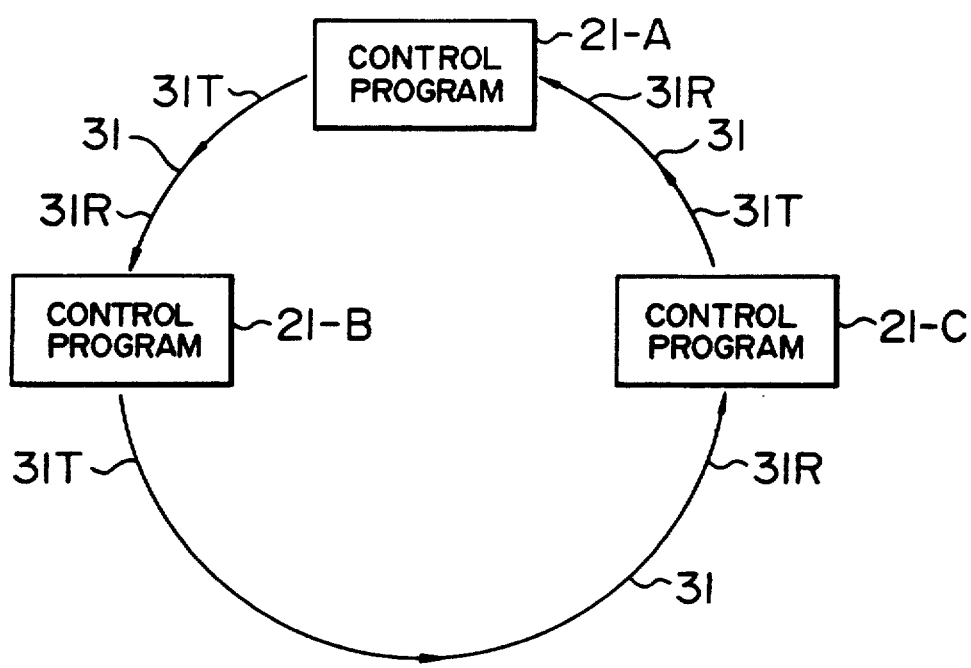
FIG. 7 is a diagram showing a constitution example of a logical input device control table.
FIG. 8 is a diagram showing an example of connections between control programs to implement a conferencing system according to the present invention.

FIG. 7 shows a logical input device control table 340 loaded in the control program 21. In this table, MAXAPS and MAXRSCS (maximum resources) respectively denote the maximum number of the interaction and utility programs 25 and 26 and that of the logical input devices 29 available in the conferencing system. The interaction and utility programs 25 and 26 and the logical input devices 29-supervised by the control program 21 are denoted with APid (1 to MAXAPS) and RSCid (1 to MAXRSCS), respectively. For each pair of APid and RSCid, there are specified a window (WIN(APid,RSCid)) corresponding to one of logical input devices, a virtual user interface file 30 (VUI(APid,RSCid)) corresponding to one of logical input devices, and a reception input type (TYP(APid,RSCid)) designating whether or not virtual input data is to be received. The reception input type may include, for example, "Window 1", "File 1", or "Original input data". The "virtual input" indicates that virtual input data is to be received, whereas the "original input data" designates that the original input data not including the header is to be received. The item "In-no-use" denotes that the associated identifier is not in use. In this embodiment, neither APid nor RSCid takes a value "0", which is not assigned to the interaction and utility programs 25 and 26 and to resources used by these programs. Namely, the value "0" is adopted, for convenience of processing, in a header of data to be communicated between control programs 21.

FIG. 8 shows a method of configuring a control program's path between three control programs 21-A to 21-C. In this diagram, the input device 1 and the output device 3 are omitted for simplification. In a conferencing system according to the present invention, each control program 21 possesses two control program's paths 31, namely, a path 31T for transmitting virtual input data to a destination control program 21 and a path 31R for receiving virtual input data from a source control program 21. A transmission control program's path 31T of a control program 21 is used as a reception control program's path 31R of the next control program 21, thereby connecting the control programs to each other in a circular control program's path. Input data from a processor 2 is transmitted along the circular control program's paths 31 to all control programs 21.

Figure 9A:
FIGS. 9A to 9E are diagrams showing methods of changing connections between control programs when a conference is held.
Figure 9B:
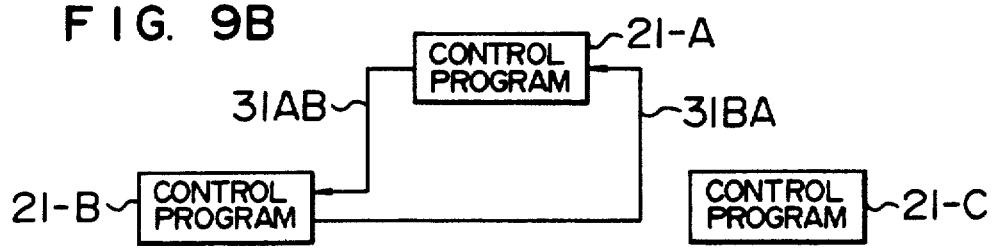
Figure 9C:
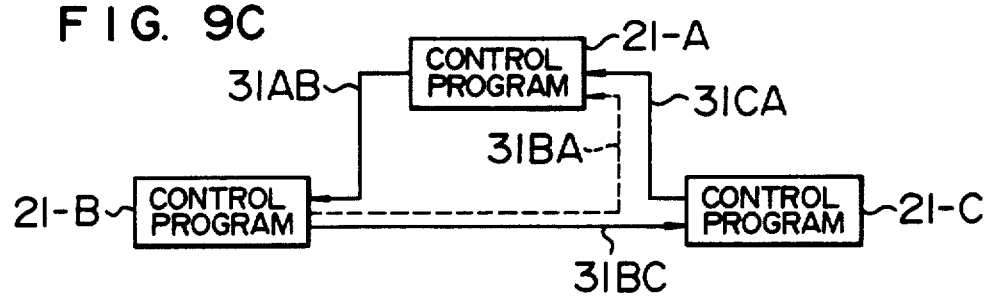
Figure 9D:
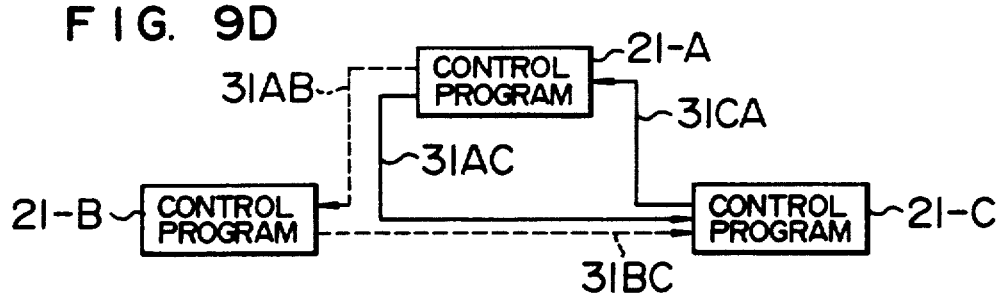
Figure 9E:
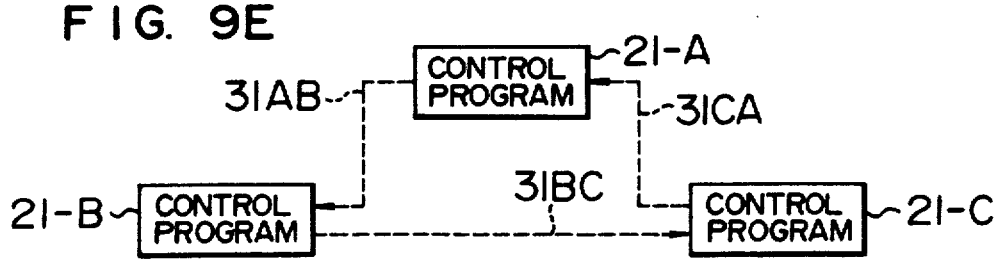

FIGS. 9A to 9E shows a method of holding a conference by connecting the control programs 21 associated with participants of a conference via the control program's paths 31. As shown in these diagrams, a description will be given of a conference held for three members A, B, and C. FIG. 9A shows a state which has resulted from the following operations. The lasers A, B, and C conduct a preparative operation for a conference from the respective workstations to open the conference room window 335, which is displayed in the associated display screen. In this state, the control programs 21 (21-A to 21-C) respectively operate in an independent manner. FIG. 9B shows a state obtained through operations as follows. The user A selects Admission 205 (specification of an admission for participation in the conference) from the conference execution command menu 195 to allow the user B to attend the conference. Thereafter, the user B selects Joining 200 (specification of participation in the conference) from the command menu 195 to request participation in the conference. As a result, there is formed a conference of two persons A and B. Through the users' operations above, control program paths 31AB and 31BA are respectively established from the control program 21-A to the control program 21-B and vice versa. FIG. 9C shows a state resultant from the subsequent operations. The user A selects Admission 205 from the menu 95 to allow the user C to participate in the conference; thereafter, the user C selects Joining 100 from the menu 195 to request participation in the conference, thereby expanding the conference to be held among three persons A, B, and C. In this case, the control program path 31BA (FIG. 9B) from the control program 21-B to the control program 21-A is first released and then control program paths 31BC and 31CA are respectively created from the control program 21-B to the control program 21-C and from the control program 21-C to the control program 21-A. FIG. 9D shows a state developed through the following operations. The user B selects Disjoining 210 (specification of disjoining from the conference) from the command menu 195 in the state of FIG. 9C, thereby reducing the conference size such that the number of conference members is decreased from three to two. The control program's paths 31AB and 31BC, respectively, from the program 21-A to the program 21-B and from the program 21-B to the program 21-C are released, and then a new path 31AC is generated from the control program 21-A to the control program 21-C. FIG. 9E shows a state created as follows. In the state of FIG. 9C, the user A selects Termination 215 (specification of termination of the conference) from the command menu 195 to terminate the conference. In this situation, all paths 31AB, 31BC, and 31CA are released.

Figure 10:
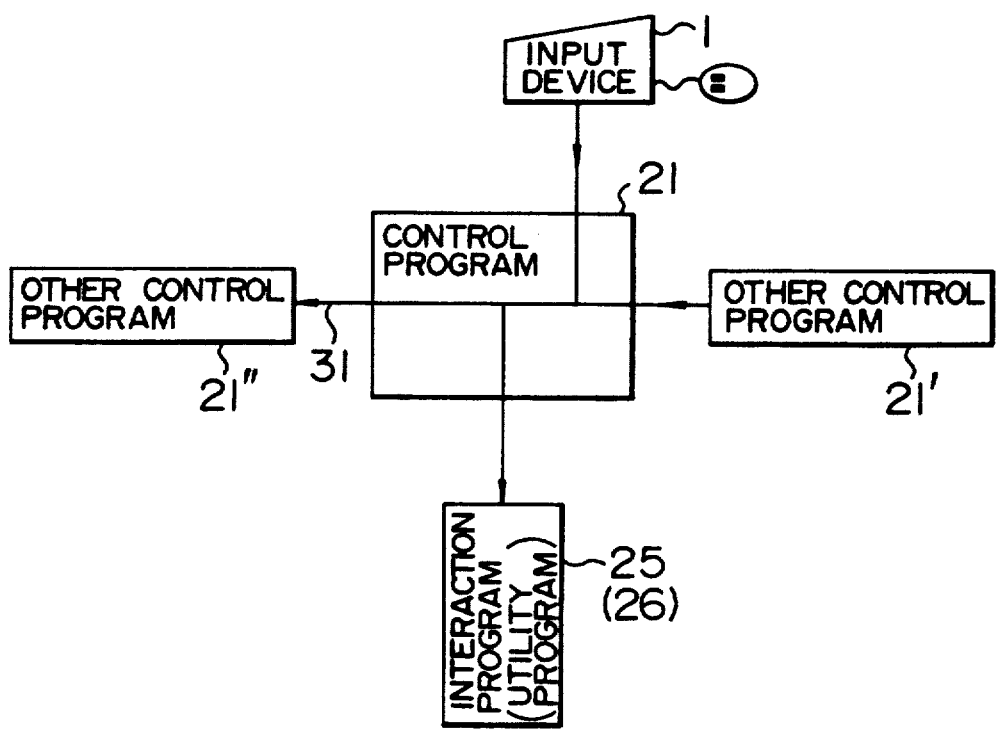
FIG. 10 is a diagram showing a data flow in a control program in a case where all data items are immediately effectuated without controlling the effectiveness of input data.

FIG. 10 is a diagram for explaining a method of processing commands in which data supplied from the input device 1 is regarded as effective data to be immediately processed. In this specification input data regarded as effective data means that the input data is qualified to be delivered to the interaction and utility programs 25 and 26. In the conventional technology, data supplied from an input device of a workstation participating in a conference and data received from another control program 21' are immediately delivered to an interaction program 25 (or a utility program 26) under supervision of the control program 21 of the pertinent workstation; moreover, the data is transmitted via the circular control program's path 31 to the subsequent control program 21''. In the prior art method, the input data supplied from the keyboard K1 or the mouse M1 is first processed in the workstation associated with the input equipment.

Figure 11:
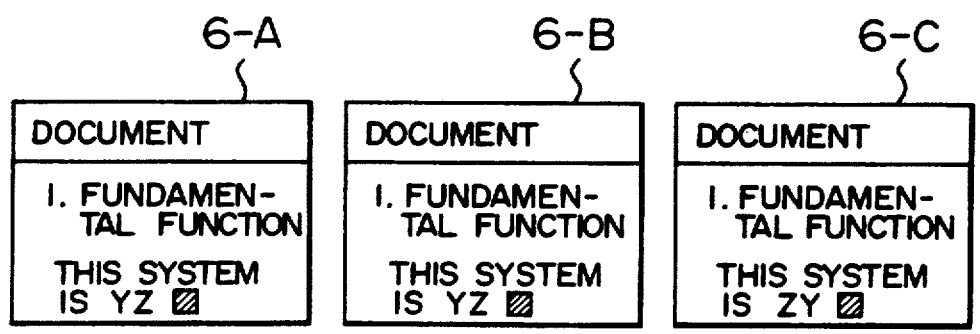
FIG. 11 is a diagram showing an example of an inconsistency of processing results appearing when the effectiveness of the input data is not controlled.
Figure 12:
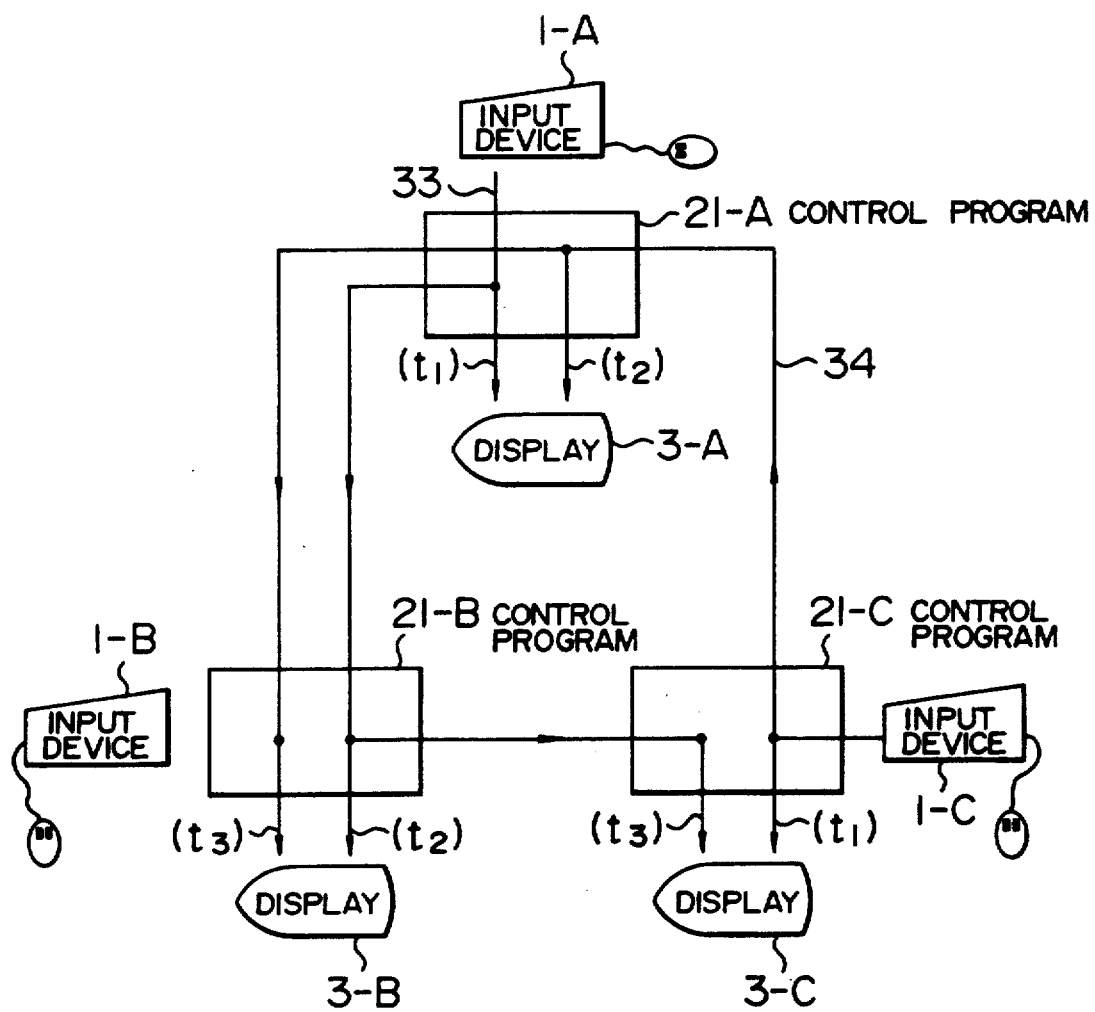
FIG. 12 is a diagram showing an example of a flow of virtual input data between control programs when the effectiveness of input data is not controlled.
Figures 13, 14:
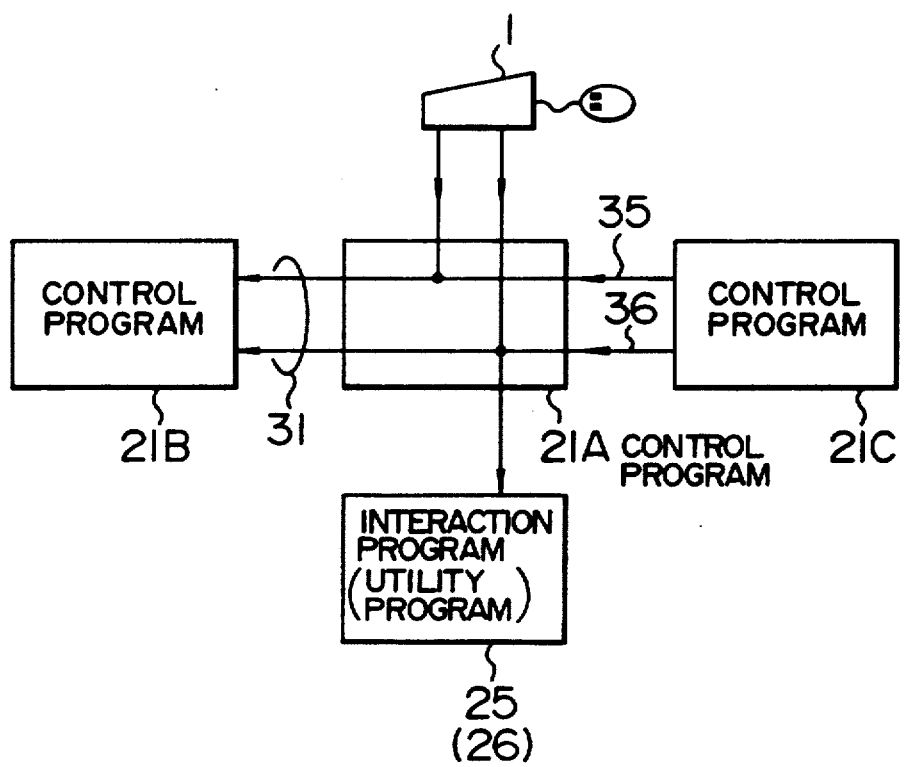
FIG. 13 is a diagram showing an example of a data reception order in which input data items are received when the effectiveness of the input data items is not controlled.
FIG. 14 a diagram showing a data flow in a control program in a case where the effectiveness of input data is controlled to prevent data in an ineffective state from being subjected to a program execution.

FIGS. 11 to 13 are diagrams useful to explain an example of inconsistency of display contents presented in the respective conference resource windows when the data effectiveness is not controlled.

Assuming here that one of the conference resource windows, for example, the document window 6 is displayed on each display screen of the workstations A to C, namely, the windows 6-A, 6-B, and 6-C present identical contents, let us consider a case in which the user A inputs a letter "Y" following a character string "THIS SYSTEM IS", the user C inputs a letter "Z" at a timing substantially identical to the input of the user A. In the conventional conferencing system, the contents of each document window 6 are presented as shown in FIG. 11.

Namely, in the window 6-A, the letter "Z" supplied from the workstation C follows the letter "Y" inputted from the workstation A; whereas, in the window 6-C, the letter "Y" is displayed after the letter "Z" supplied from the workstation C.

FIG. 12 is a diagram for explaining a cause of the inconsistency above. For simplicity of explanation, it is assumed here that a data input operation takes place from the workstations (users) A and B substantially at the same time and the period of time which has elapsed to transfer data from a control program 21 to another control program 21 via a control program's path is fixed regardless of the positions of workstations associated with the control programs 21. In a flow of data as shown in FIG. 12, a dot or a solid small circle indicates that data received by a control program 21 is effective for an interaction program 25 under control of the control program 21.

When data items "Y" and "Z" are simultaneously inputted respectively from the workstations A and C, the data items "Y" and "Z" are displayed on the respective screens at a point of time t1. These items are sent respectively via data flows 33 and 34 to the next stations such that the letter "Y" is displayed on the screen of the workstation B at a point of time t2 and on the screen of the workstation C at a point of time t3. Similarly, the letter "Z" is displayed on the workstation A at the point of time t2 and on the workstation B at the point of time t3. As a result, the data input order of the workstation C is reverse to that of the workstations A and B, which leads to the inconsistency of the display contents. FIG. 13 shows a relationship between the data reception orders and points of time in the workstations A, B, and C.

FIG. 14 is a diagram for explaining a principle of the conference data control devised to remove the inconsistency in accordance with the present invention. According to the present invention, in a workstation, data (including commands) received from an input device thereof and data (including commands) received from other workstations each take an effective or an ineffective state. Furthermore, one of workstations (control programs) participating in a conference is assigned with a qualification (called an effectuation floor qualification) to effectuate the data from its own input device and/or the data received from other workstations. Data supplied from input devices of the workstations not assigned with the effectuation floor qualification are set to the ineffective state. The data in the ineffective state is changed to the effective state only when the data is received by the workstation having the effectuation floor qualification. In each workstation, only the data in the effective state is subjected to the interaction or utility programs. Data in the ineffective state is not subjected to any one of the interaction and utility programs 25 and 26. As indicated by a data flow 35, the input data in the ineffective state, regardless of data inputted from the input device 1 or data received from other control programs 21, is processed to be sent via a control program path 31 to the next control program 21 without being passed to any one of the interaction and utility programs 25 and 26 under supervision of its own control program 21. Input data in the effective state, including data inputted from the input device 1 and data received from other control programs 21, is handled to be passed to one of the interaction and utility programs 25 and 26 under control of the own control program 21 and to be then sent via a control program path 31 to the next control program 21. In this method, a supplied input data item is set to an effective state at a certain point of time. From this point of time, the input data is allowed to be delivered to an interaction program 25 or a utility program 26.

According to the present invention, the effectuation floor qualification may be exclusively assigned to a particular workstation. Alternatively, the effectuation floor qualification may be moved from one workstation to another workstation depending on an operation state (user's operation state) of each workstation. When a workstation, actually, a control program 21, is assigned with the effectuation floor qualification, input data entered from an input device 1 connected thereto is immediately set to the effective state. Moreover, input data in an ineffective state received from another control program 21 is set to the effective state only when the input data is received by a workstation having the effectuation floor qualification. Consequently, in general, a position where input data is generated is different from a position where the input data is set to the effective state.

FIG. 15 shows the conference data control in comparison with that of the prior art of FIG. 12. In the configuration of FIG. 15, the data input points of time and the data transfer period of time are assumed to be respectively the same as those of FIG. 12. Let us assume now that a control program 21-A has the effectuation floor qualification. In data flows 37 and 38 of data items respectively supplied from input devices 1-A and 1-C, a dot or a solid small circle denotes that the pertinent input data item is effective for an interaction program 25 under supervision of a control program 21 associated with the dot, whereas a small open circle indicates that the data item is not effective for the interaction program 25.

In a case where users A and C respectively input data items "Y" and "Z" substantially at the same time t1, only the letter "Y" effectuated by the control program 21-A is reflected onto the display screens at the point of this operation. The letter "Z" supplied to a control program 21-C not assigned with the effectuation floor qualification is not presented on the display 3-C. Namely, the letter "Z" is transmitted to the next workstation via the data flow 38. On receiving the letter "Z", the control program 21-A effectuates the letter "Z", which is then presented on a display 3-A at a point of time t2. These data items "Y" and "Z" are respectively sent via the data flows 37 and 38 through workstations in a sequential fashion to be displayed on the display screen of the workstations 3-B and 3-C.

FIG. 16 is a table for explaining time-series display changes in the respective workstations when the above operations are conducted in the embodiment. According to the present invention, it is to be understood that the contents of the respective display screens are controlled such that the same contents are presented in each display screen in the order in which data items are received by the workstation (control program) having the effectuation floor qualification.

FIG. 17 shows an example of the format of virtual input data 39 produced in an input virtualization module 22 constituting the control program 21. The virtual input data 39 includes an input data field 45 containing data inputted from the input device 1 and a header field containing five fields 40 to 44 disposed for control operations to be achieved by the control program 21. More concretely, the respective fields of the header includes a virtual input data originator control program identifier (to be simply referred to as an originator identifier and to be abbreviated as ORIG) 40, a virtual input data effectuated control program identifier (to be simply referred to as an effectuator identifier and to be abbreviated as EFF) 41, a reach (to be represented as REACH) 42, an interaction program identifier (to be also referred to as an AP identifier and to be abbreviated as APid) 43, and an interaction program resource identifier (to be also referred to as a resource identifier and to be abbreviated as RSCid) 44.

The originator identifier 40 denotes an identifier of a control program 21 having received the input data 45 from the input device 1.

The effectuated identifier 41 designates an identifier of a control program 21 having effectuated the virtual input data 39. When the input data 45 is in the ineffective state, this field 41 is loaded with an identifier indicating "In-no-use".

The reach 42 defines a range of the control programs 21 to which the virtual input data is to be delivered. For example, when the reach 42 is specified as "All control programs", the virtual input data 39 is passed to all control programs 21. An ordinary input data item to be passed to an interaction program 25 is also processed in this range. When the reach 42 denotes "Next control program", the virtual input data 39 is transferred only to a control program 21 of a workstation at the next position along the circular control program's path 31.

The AP identifier 43 is an identifier of an interaction program 25 to which the virtual input data 39 is to be delivered. Based on information of the AP identifier 43, the virtual input data 39 is fed to an appropriate interaction program 25.

The resource identifier 44 is an identifier of a logical input device 26 from which the virtual input data 39 is supplied. Based on information items respectively of the AP identifier 43 and the resource identifier 44, the virtual 15 input data 39 is transferred to an appropriate virtual user interface file 30.

An interaction program 25, like an existing program, operating under supervision of a control program 21, without knowing the existence of the control program 21, is supplied with the input data 45 created by removing the header portion from the virtual input data 39. On the other hand, the virtual input data 30 including the header is passed to the interaction and utility programs 25 and 26 capable of handling the contents of the header field.

FIG. 18 shows a virtual input data effectuation floor qualification control table 46 disposed in a control program 21. This table 46 includes an entry of presence or absence of the effectuation floor qualification for each pair of the AP identifier (APid) 43 and the resource identifier (RSCid) 44. The presence and absence of the effectuation floor qualification are denoted as "1" and "0", respectively. The effectuation floor qualification is represented with a symbol EFF (APid, RSCid) in this table 46.

A description will now be given of the processing or procedure flow of the input virtualization module 22, the communication control module 23, and the virtual I/O control module 24 in a case of the effectuation floor qualification fixed to a control program 21.

Figures 19, 22:
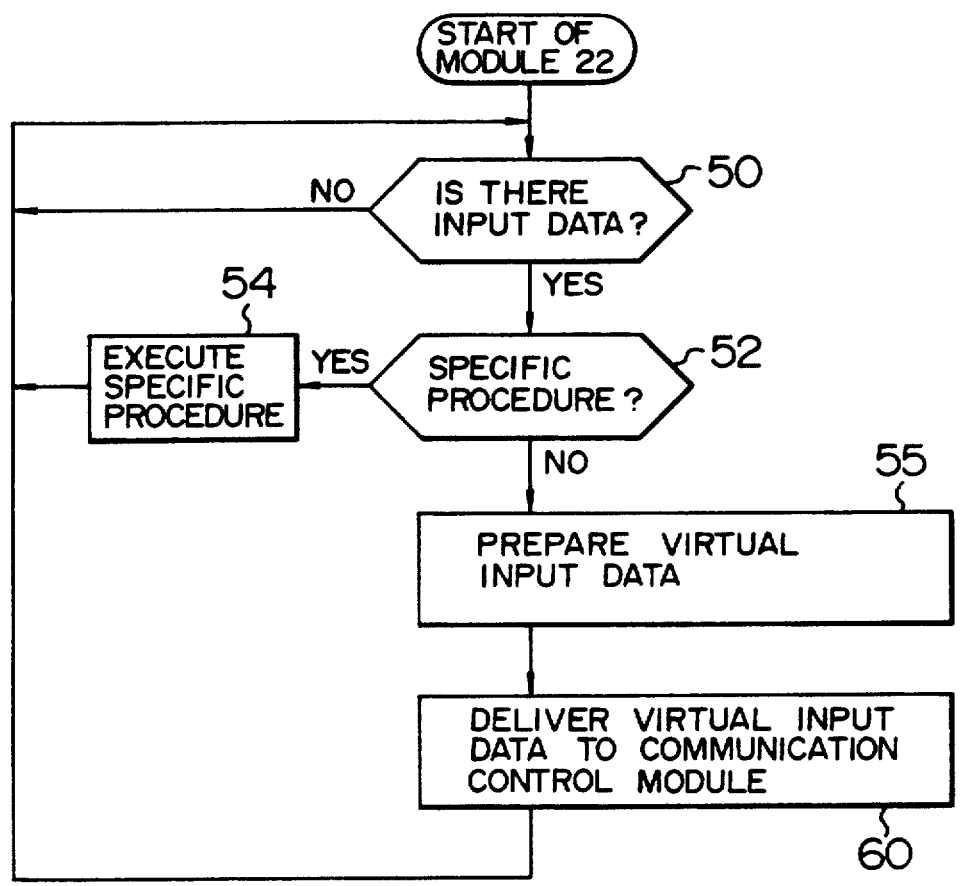
FIG. 19 is a flowchart showing the operation of processing exacted by an input virtualization module.
FIG. 22 is a diagram showing an example of the constitution of a virtual input data processing mode control table.

FIG. 19 shows a processing flow of input data in the input virtualization module 22. This module 22 monitors an occurrence of input data (including commands) supplied from the input device 1 (step 50). When input data is received, a window used to deliver the input is identified. If the input data requests processing or a procedure unique to the input virtualization module 22, the necessary processing is carried out (steps 52 to 54). Otherwise, the input data is processed to create virtual input data (step 55). Namely, a header containing the following data items is added to the input data. An identifier of the control program 21 is loaded as the originator identifier 40, "In-no-use" is stored as the effectuated identifier 41, and a code indicating "All control programs" is set as the reach 42. Moreover, the logical input control table 340 is referenced to attain an identifier of an interaction program 25 using the window associated with the input data so as to load the identifier as the AP identifier 43. In addition, the table 340 is again referenced to determine a window as the logical input device 29 from the windows used by the interaction program 25, thereby setting an identifier of the logical input device 39 as the resource identifier 44. After preparing the header as above, the input virtualization module 22 delivers the virtual input data to the communication control module 23 (step 60).

Figure 20:
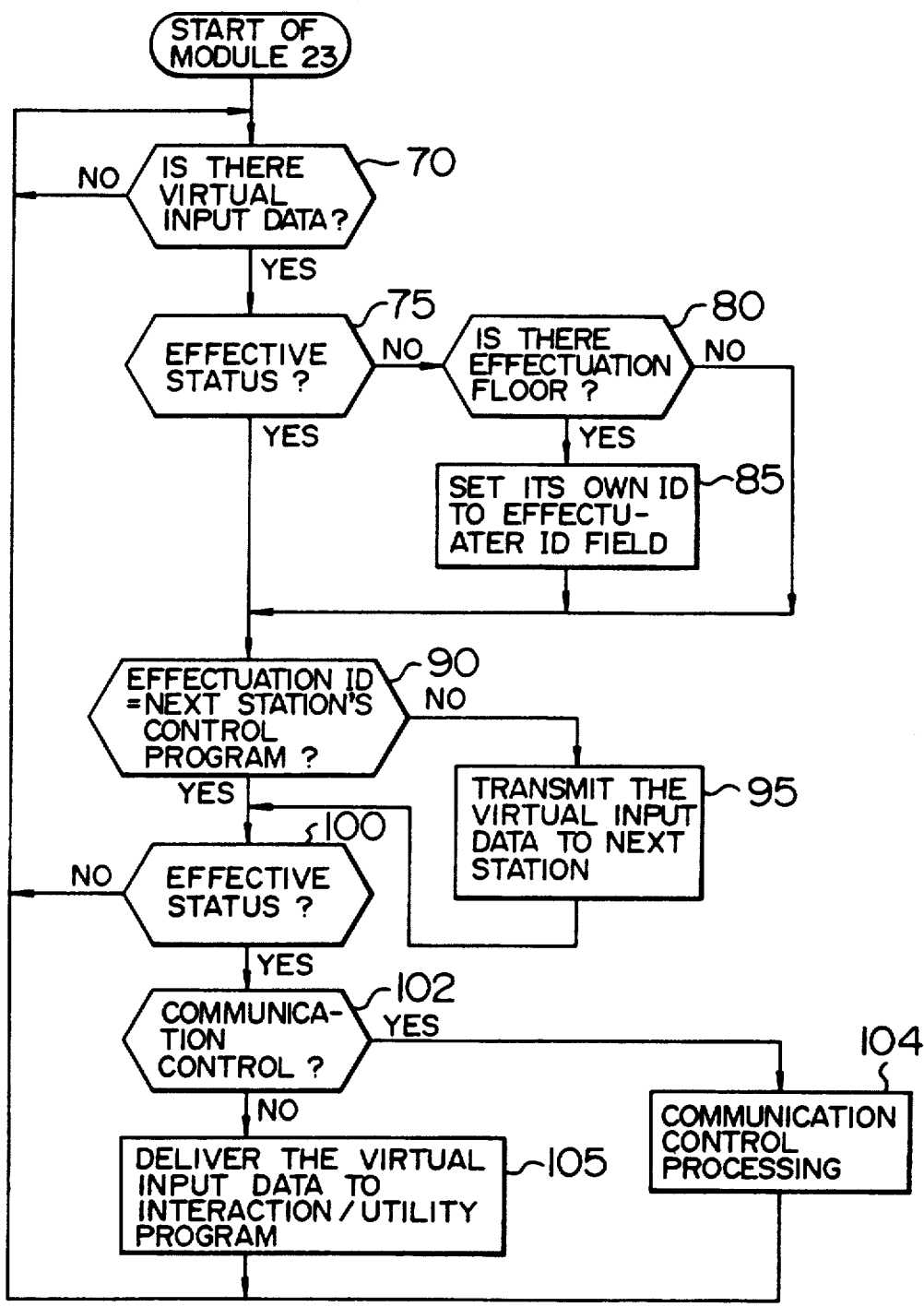
FIG. 20 is a flowchart useful to explain the operation of a communication control module.

FIG. 20 shows a processing flow of the virtual input data in the communication control module 23. This module 23 monitors a reception of virtual input data from the input virtualization module 22 or from a communication control module 23 related to another control program 21 (step 70). When virtual input data is received, the communication control module 23 checks to determine whether or not the received data is already effectuated (step 75). If this is not the case, this module 23 references the effectuation control table 46 to determine whether or not this module has an effectuation floor qualification for the virtual input data (step 80). If the effectuation floor is present, an identifier of the own control program 21 is loaded in the effectuated identifier field 41 and then the virtual input data is effectuated (step 85). The communication control module 23 thereby completes the effectuation processing. Subsequently, in order to decide whether or not the virtual input data is necessary for a control program 21 in another workstation, it is checked to determine whether or not the content of the effectuated identifier field 41 or the effectuated identifier 41 indicates a control program of a workstation at the next position in the circular control program's path 31 (step 90). If the virtual input data has been effectuated by a control program 21 of a workstation on the downstream side with respect to the own workstation, the virtual input data need not be outputted to the control program's path 31. Otherwise, the virtual input data is transmitted to a control program 21 of the next workstation along the path 31 (step 95). If the virtual input data is in the ineffective state, the effectuated identifier 41 denotes "In-no-use", and hence the virtual input data is transmitted as above. Next, the virtual input data is again checked for the effectiveness thereof (step 100). If the data is in the ineffective state, control returns to the step 70 without achieving any other operations. If the data is in the effective state and requests communication control processing, the necessary communication control is conducted and then control is returned to the step 70 (steps 102 to 104). If the communication control processing is not required, in order to pass the virtual input data to an interaction program 25 or a utility program 26, the virtual input data is transferred to the virtual I/O control module 24 and then control returns to the step 70 (step 105).

Figure 21:
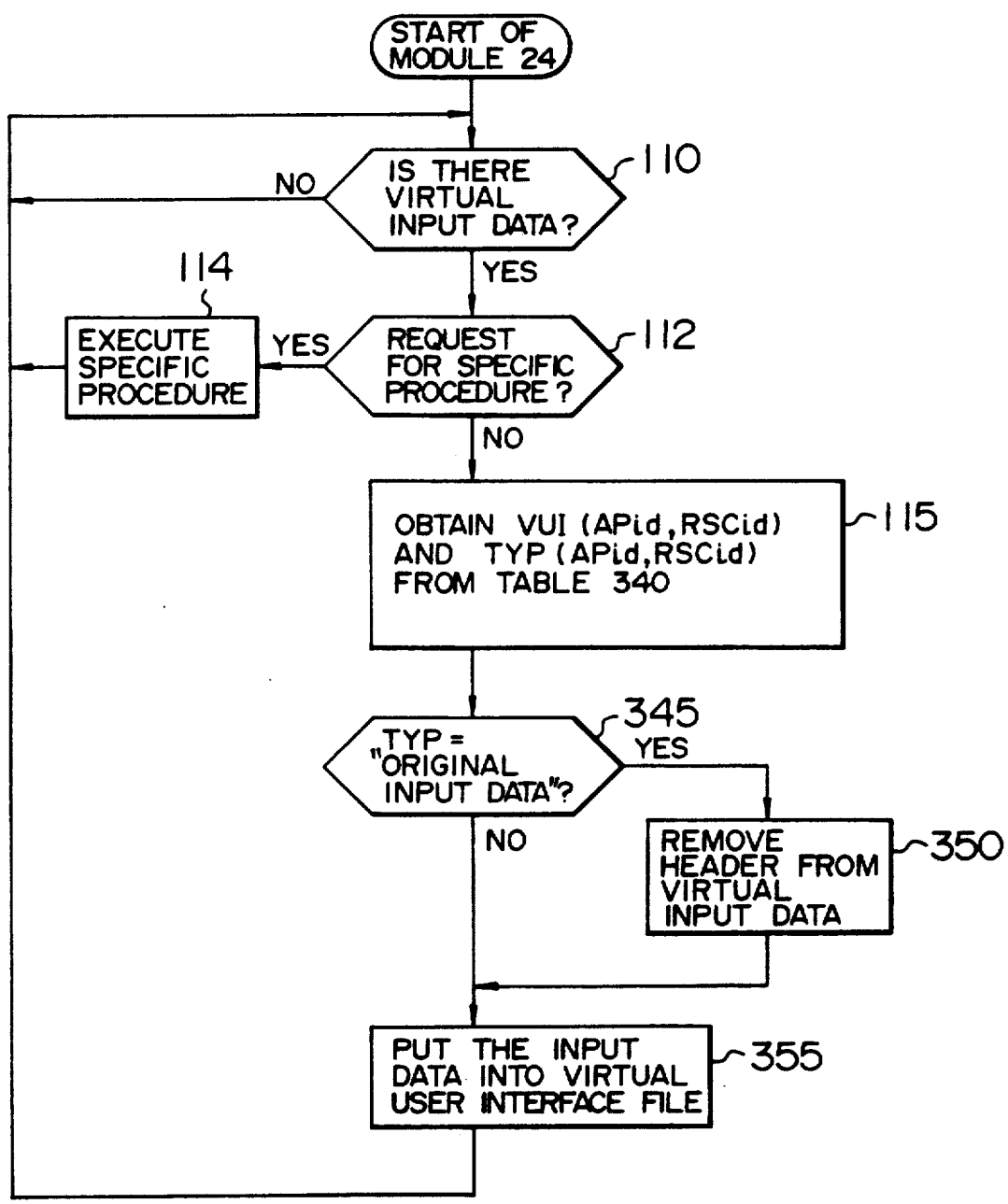
FIG. 21 is a flowchart for explaining the operation processed in a virtual I/O control module.

FIG. 21 shows a processing flow of the virtual input in the virtual I/O control module 24. This module 24 monitors virtual input data from the communication control module 23 (step 110). On receiving virtual input data, if the data requests processing unique to the I/O control module 24, the requested processing is carried out and then control is passed to the step 110 steps 112 to 114). In the unique processing decision step 112, the virtual I/O control module 24 checks the AP identifier 43 and the resource identifier 44 contained in the header of the virtual input data. If each of these items 43 and 44 contains "0", the virtual input data is assumed to be communication data between the control programs 21 and hence is subjected to the unique processing (step 114). In other cases, based on the AP identifier (APid) 43 and the resource identifier (RSCid) 44 obtained from the header of the virtual input data, the logical input control table 340 is referenced to determine a virtual user interface file 30 (VUI(APid, RSCid)) and an acceptable input type (TYP(APid, RSCid)) respectively associated with the pair of APid and RSCid above (step 115). If the acceptable input type designates "Virtual input data", the virtual input data is directly set to the user interface file 30 identified by VUI(APid, RSCid); moreover, if the type denotes "Original input data", the input data portion, which is generated by removing the header portion from the virtual input data, is set to the virtual user interface file 30 (steps 345 to 355). The input data is transferred in an appropriate format as above to an interaction program 25 or a utility program 26. Namely, the program 25 or 26 thereafter reads the objective input data from the virtual user interface file 30.

As described above, for all input data items, the effectiveness and the ineffectiveness thereof are controlled depending on the effectuation floor qualification to prevent the inconsistency from appearing in the contents of conference resource windows. However, some input data items inherently does not necessitates such a control operation. In the embodiment according to the present invention, in addition to the control operation achieved depending on the effectuation floor qualification assigned to a control program 21, an effectuation control to be effected based on the input processing configuration associated with the interaction and utility program 25 and 26 has also been taken into consideration.

For example, the pointing objects (PC) 8a to 8c described in conjunction with FIG. 2 are respectively unique to the workstations or the users thereof and hence there does not occur such an operation in which a plurality of users supply a shifting or moving instruction to an identical pointing object substantially at the same time. In consequence, for the data input related to the pointing object operation, each user of a workstation can freely effectuate input data without considering any fear of occurrence of inconsistency between the own workstation and other workstations.

Next, the effectuation depending on the input processing configurations will be described by referring to a pointing object control program as an example.

FIG. 2 shows the structure of a virtual input data processing mode control table 120 supervised by a control program 21. A virtual input data processing mode can be set in association with each interaction program 25 or a utility program 26 and each resource used by the program. That is, this table 120 contains an entry item of a virtual input data processing mode (MOD(APid, RSCid)) for each pair of an AP identifier (APid) 43 and a resource identifier (RSCid) 44.

For the pointing object control program, the virtual input data processing mode denotes whether or not the virtual input data to be delivered to an interaction program 25 or a utility program 26 is in a mode (pointing object mode) in which the virtual input data is to be passed to the pointing object control program. In the table 120 of FIG. 22, "P" and "B" respectively indicate the states in which MOD(APid, RSCid) designates that the virtual input data is respectively in the PO mode and in other than the PO mode. On receiving the virtual input data from an input device 1, a control program 21 checks the control table 120 to determine whether or not an entry associated with the pair of APid and RSCid of the data is set to "P" for the PO mode. If this is the case, regardless of whether or not the control program 21 has the effectuation floor qualification, the virtual input data is set to the effective state.

Figure 23:
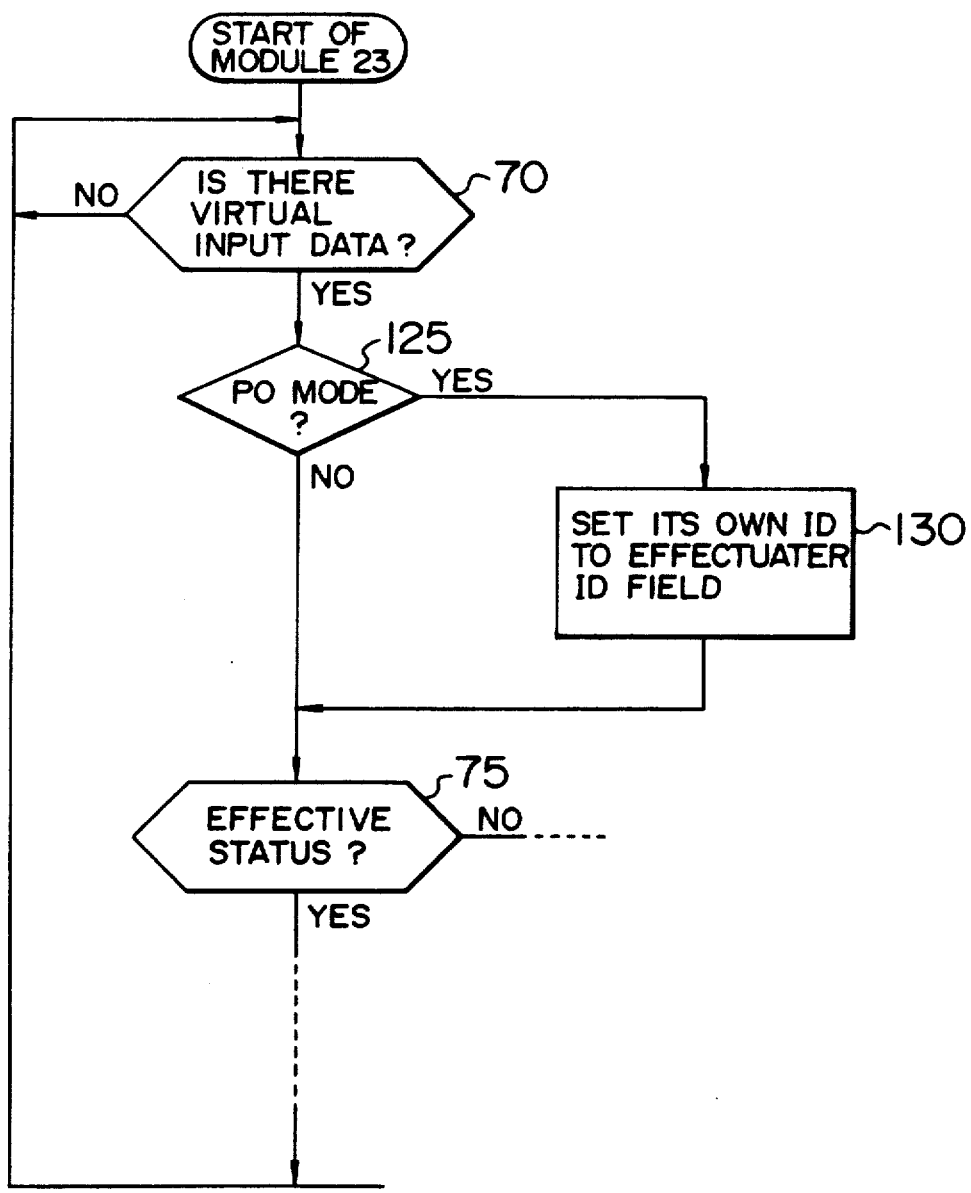
FIG. 23 is a flowchart useful to explain the operation achieved by a communication control module in consideration of the virtual input data processing mode.

FIG. 23 shows a processing flow of the communication control module 23 in the embodiment in which the virtual input data processing mode is taken into consideration In this flowchart, the same processing steps as those of FIG. 20 are omitted. On receiving the virtual input data from the input virtualization module 22 (step 70) the communication control module 23 references, before examining the effective or ineffective state of the data, the virtual input data processing mode control table 120 based on the pair of the AP identifier (APid) 43 and the resource identifier (RSCid) 44 of the data to check the processing mode EFF(APid, RSCid) of the virtual input data (step 125). If the processing mode is the pointing object (PO) mode, in order to immediately deliver the virtual input data from the control program 21 to the PO control program 26, the own identifier of the control program 21 is stored in the effectuated identifier field 41 so as to effectuate the virtual input data (step 130). Thereafter, the processing is executed in the same manner as for the procedure described in conjunction with FIG. 20.

Figures 24, 25:
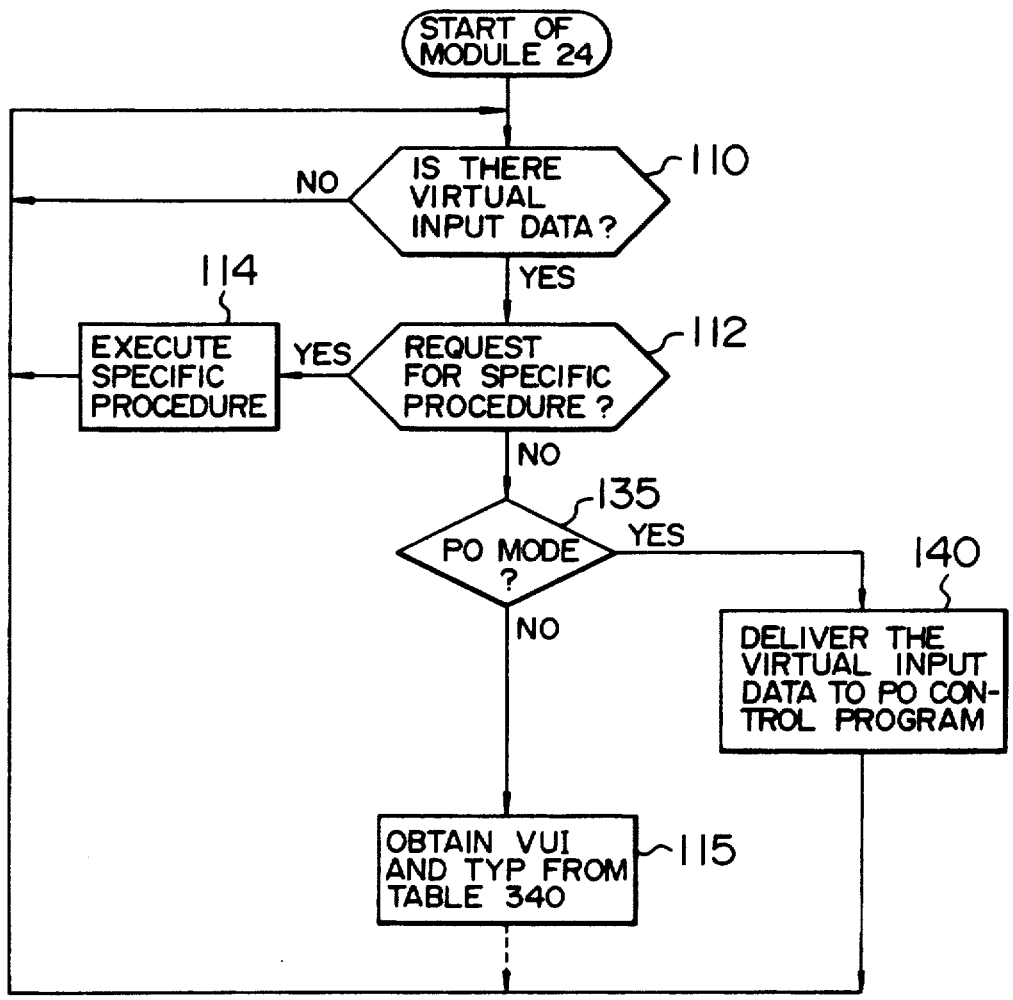
FIG. 24 is a flowchart showing the operation conducted by the virtual I/O control module in consideration of the virtual input data processing mode.
FIG. 25 is a diagram showing an example of the configuration of an effectuation floor qualification control table.

FIG. 24 shows a processing flow of the virtual I/O control module 24 in which the virtual input data processing mode is taken into consideration. In this flowchart, the same processing steps as those of FIG. 21 are omitted. Like in the embodiment of FIG. 22, at an occurrence of virtual input data (step 110), the virtual I/O control module 24 checks to determine whether or not a procedure or processing unique thereto is requested (step 112). If this is not the case, before passing control to a step 115, the virtual I/O control module 24 references the virtual input data processing mode control table 120 based on the pair of the AP identifier (APid) 43 and the resource identifier (RSCid) 44 of the data to check the processing mode EFF (APid, RSCid) thereof (step 135). If the processing mode is the pointing object (PO) mode, the virtual input data is delivered to the PO control program 26 via a virtual user interface file 30 identified by VUI(APid, RSCid) (step 140). If the processing mode is other than the PO mode, the subsequent processing is executed beginning from the step 115 in the same manner as that described in conjunction with FIG. 21.

In the description above, the effectuation floor qualification is fixedly assigned to one of a plurality of control programs constituting the conferencing system. Subsequently, a description will be given of a case where the effectuation floor qualification is moved from a control program to another control program in a process of a conference. In this operation, the effectuation floor qualification is transferred from a control program 21 to another control program 21 when a predetermined condition is satisfied.

FIG. 25 shows an embodiment of the virtual input data effectuation floor qualification control table 46 adopted to decide whether or not a control proqram 21 having the effectuation floor qualification is to transfer the effectuation floor qualification to a control program 21 of another workstation.

In this embodiment, like in the embodiment of FIG. 19, the effectuation floor qualification is assigned to a pair of an AP identifier (APid) 43 and a resource identifier (RSCid) 44 moreover, it is stipulated here that the effectuation floor qualification is not assigned or is assigned to the pertinent control program 21 when the effectuation floor qualification field EFF(APid, RSCid) contains a value of "In-no-use" or an integer not less than 0, respectively.

In this embodiment, on receiving the effectuation floor qualification EFF(APid, RSCid) transferred from a workstation (control program), a workstation having received the effectuation floor qualification initializes the EFF(APid, RSCid) to 101 in the control table 46. Each control program operates based on the value of the effectuation floor qualification EFF(APid, RSCid). Namely, on effectuating virtual input data received from another workstation, the control program increments the integer value of EFF(APid, RSCid) by one; whereas, on effectuating virtual input data supplied from an input device of the own workstation, the control program decrements the value by one. However, the decrementation is controlled such that the effectuation floor qualification EFF(APid, RSCid) is not set to a negative value, namely, the minimum value thereof is limited to zero. Through the incrementation and the decrementation accomplished depending on whether the effectuated data is associated with the other stations or own station, the count value of the effectuation floor qualification is gradually increased when the input operation from the own input device is more frequently conduct and vice versa.

According to the feature of the present invention, for each effectuation of the virtual input data in the respective control programs, the value of the effectuation floor qualification EFF(APid, RSCid) is incremented or decremented by one and then the resultant value is checked against a threshold value MAXEFF. If the value becomes to be equal to the MAXEFF, the effectuation floor qualification EFF(APid, RSCid) is transferred to a control program of the next workstation. With this provision, excepting the workstation where the input operation is frequently accomplished from the own input device, the effectuation floor qualification EFF(APid, RSCid) is sequentially passed from a control program to another control program. Resultantly, the effectuation floor qualification EFF(APid, RSCid) is transferred to a workstation of a data source so as to implement a screen control operation such that the contents of the respective display screens are altered at a high speed in response to the user's operations.

Figure 26:
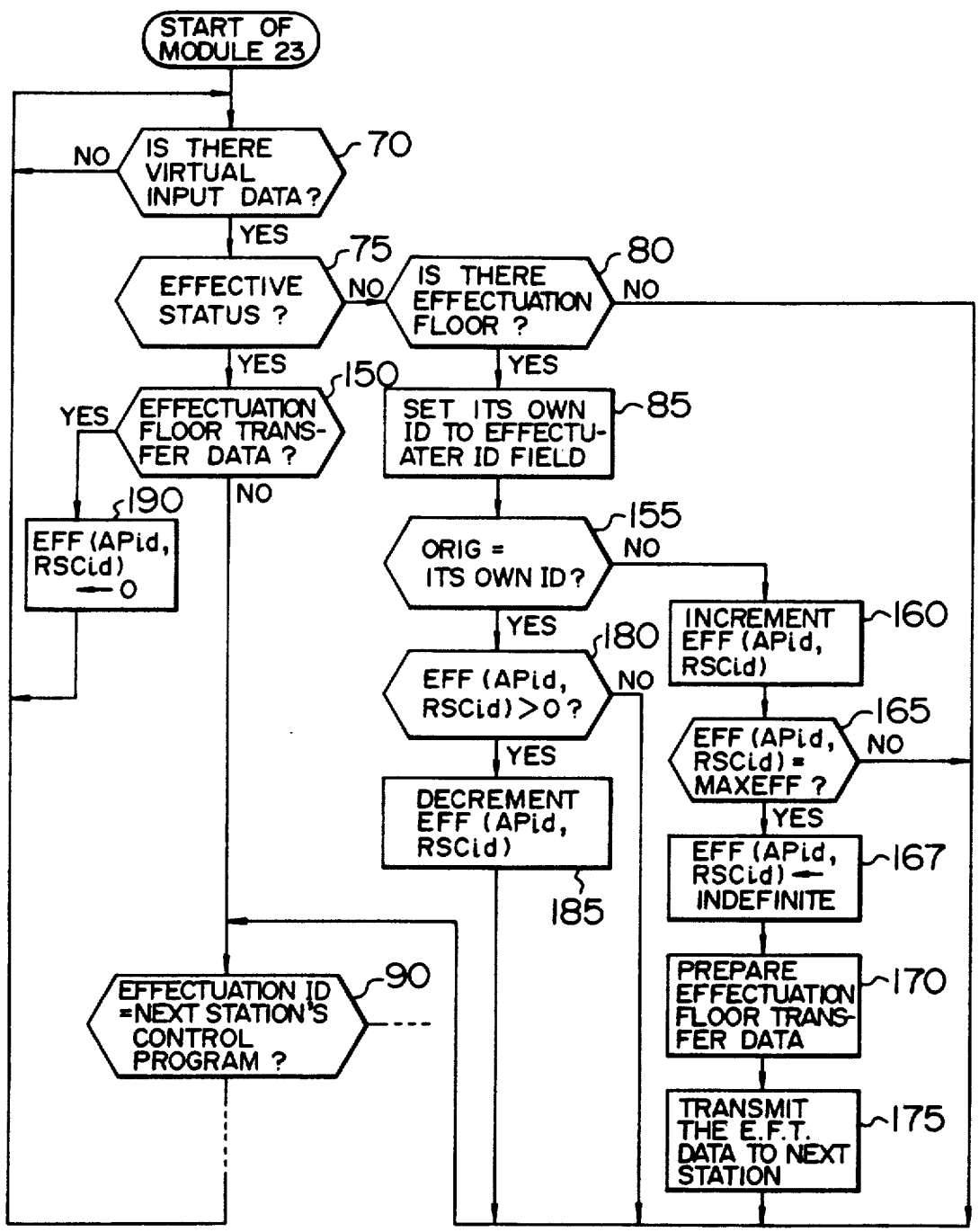
FIG. 26 is a flowchart for explaining the operation accomplished by a communication control module transferring the effectuation floor qualification.

FIG. 26 shows a processing flow of a procedure conducted in the communication control module 23 when the effectuation floor qualification is transferred between control programs. In this configuration, the same portions as those of FIG. 20 are omitted. On receiving virtual input data from the input virtualization module 22 (step 70), the communication control module 23 examines the effectiveness of the input data (step 75). If the data is in the ineffective state, the module 23 checks to determine presence or absence of the effectuation floor qualification of the control program 21 (step 80). If this is the case, like in the embodiment of FIG. 20, the field 41 disposed to designate an effectuator of the virtual input data is loaded with the identifier of the own control program (step 85). Thereafter, a procedure of the effectuation floor qualification transfer is conducted as follows.

In the flowchart of FIG. 26, EFF(APid, RSCid) denotes the effectuation floor qualification loaded in the effectuation floor qualification control table 46 for each pair of an AP identifier (APid) 43 and a resource identifier (RSCid) 44 of the virtual input data. When the originator (ORIG) 40 of the virtual input data thus effectuated is identical to the identifier of the own control program 21 (step 155), the value of EFF(APid, RSCid) is decremented by one in the control table 46 if the value thereof is positive (step 185). When the originator identifier (ORIG) 40 is unequal to the identifier of the own control program 21 (step 155), the value of EFF(APid, RSCid) is incremented by one (step 160).

As a result, if the value of EFF(APid, RSCid) reaches the value indicated as MAXEFF (step 167), a sequence of processing steps 167 to 175 are accomplished to achieve an effectuation floor qualification transfer. Namely, a value of "In-no-use (indefinite)" is set to the EFF(APid, RSCid) field of the control table 46 to remove the effectuation floor qualification from the control program 21 associated with the pair of APid and RSCid (step 167). The communication control module 23 then creates effectuation transfer data, which will be described later, to report an effectuation floor qualification transfer to the next control program 21 along the control program's path 31 (step 170). The transfer data is sent via the path 31 to the next control program 21 (step 175). Incidentally, before passing control to the step 90 of FIG. 26, this module 23 checks to determine whether or not the virtual input data is effectuation transfer data sent from another control program 21 (step 150). If this is the case, 101 is loaded in a field of the effectuation floor qualification control table 46 associated with a pair of APid and RSCid obtained from the effectuation floor qualification transfer data (step 190). As a result, the effectuation floor qualification EFF-(APid, RSCid) is possessed by the control program 21.

The effectuation floor qualification data need only be created in the same format as for the virtual input data of FIG. 17. The data fields are prepared as follows to transfer the effectuation floor qualification EFF(APid, RSCid) to a control program of the next workstation through the circular control program's path 31. Namely, the originator (ORIG) field 40 and the effectuated (EFF) field 41 each are loaded with the identifier of the own control program 21. An identifier of a control program 21 of the next workstation is stored in the reach (REACH) field 42 and a value "0" is set to each of the AP identifier field 43 and the resource identifier field 44. The data field 45 is loaded with a code denoting "effectuation floor qualification transfer", APid, and RSCid. on receiving the effectuation floor qualification data, the control program of the next workstation discriminates, based on the value "0" loaded in the fields 43 and 44 thereof, the received data from ordinary data to be delivered to an interaction program 25 or a utility program 26. Regarding the data as control data between control programs, the control program references the data field 45 to recognize the data to be effectuation floor qualification transfer data.

Figure 27:
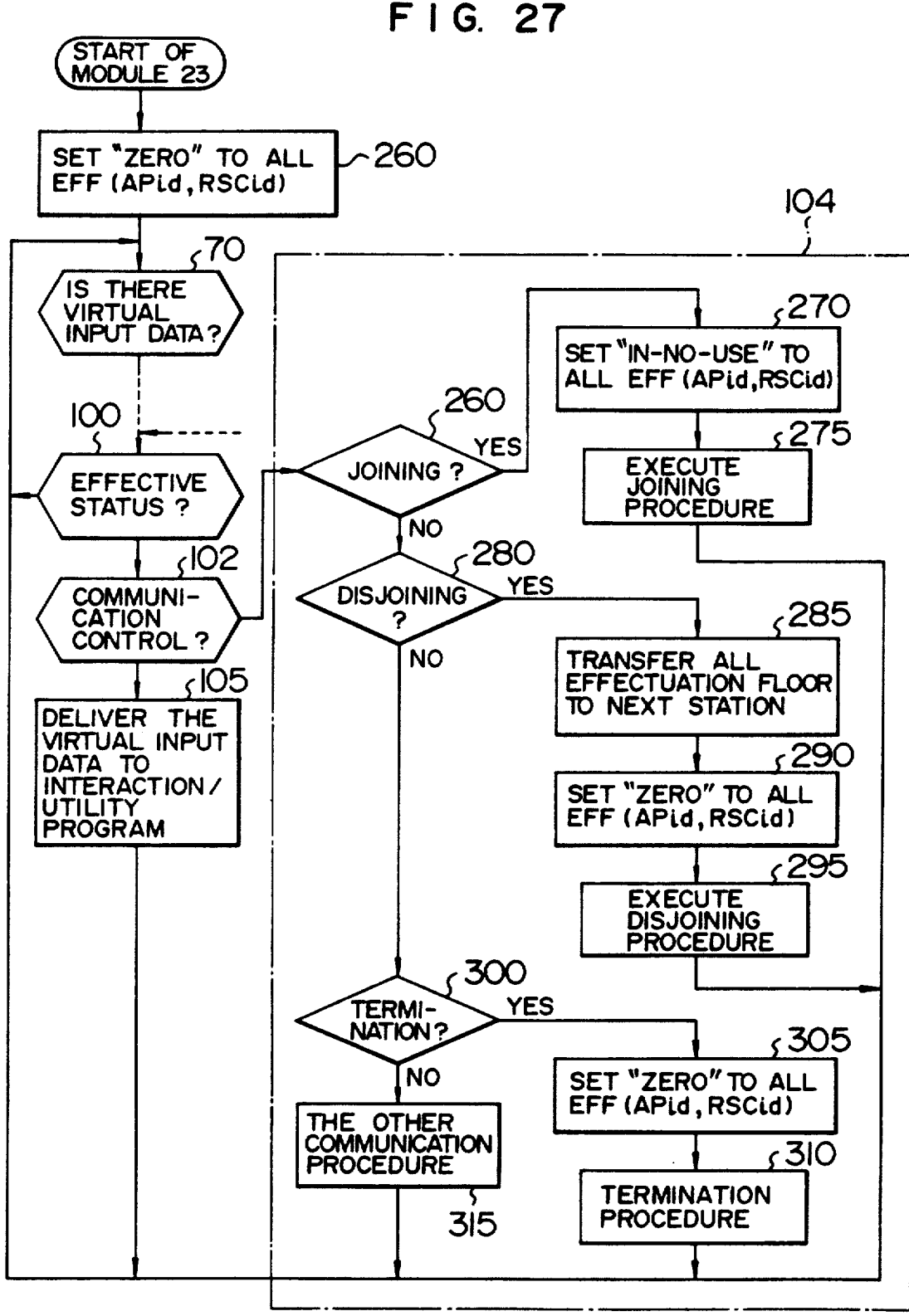
FIG. 27 is a flowchart useful to explain an initialization of an effectuation floor qualification control table in the communication control module.

FIG. 27 shows a processing flow of a procedure of initializing the effectuation floor qualification control (supervision) table 46 in the communication control module 23, not shown in the flowchart of FIG. 26.

In each workstation, when the communication control module 23 is first executed, a step 260 initializes the effectuation floor qualification control table 46. In the initialization step 260, a value "0" is set to each field of the effectuation floor qualification EFF(APid, RSCid) field in the table 46. In the respective workstations not actually connected to each other to function as members of a conferencing system, the own control program is to be independent of the control programs of the other workstations so as to access any interaction and utility programs 25 and 26 and any resources. Namely, the table initialization step 260 is necessary for the workstations in the stand-alone state to achieve the ordinary data processing.

When a conference is commenced with a plurality of workstations as members thereof, the state of the effectuation floor qualification is required to be appropriately altered depending on modes (such as joining and disjoining operations) of the workstations. That is, although each workstation has the effectuation floor qualification for all associated resources at the completion of the step 260 as described above, when a conference is started between two workstations, it is necessary to assign the effectuation floor qualification only to a workstation initiating the conference such that the effectuation floor qualification is removed from the other workstations. In a case of a conference including three or more workstations, when a workstation desires to disjoin therefrom, the effectuation floor qualification assigned to the workstation (control program) at the point of the disjoining request are required to be passed to another control program. In order for the workstations retired from the conference and for the workstations for which the conference is terminated to achieve operations in the standalone state, the effectuation floor qualification for the resources are required to be assigned thereto.

In the embodiment of FIG. 27, the communication control processing routine 104 carries out alterations in the assignment of the effectuation floor qualification in association of the operations associated with the joining, disjoining and termination.

For virtual input data associated with a joining command issued when the "Joining" 200 is selected from the conference execution command menu 195 and a control program participates in a conference (step 260), the effectuation floor qualification EFF(APid, RSCid) field is set to a value of "In-no-use" for all pairs of the AP identifier (APid) 43 and the resource identifier (RSCid) 44 (step 270). As a result, the workstation having just participated in the conference provisionally loses the effectuation floor qualification for the resources. Thereafter, the control program 21 (actually, the communication control module 23) achieves a communication procedure related to the joining command (step 275) and then passes control to the step 70. When the "Disjoining" 210 iS selected from the menu 195 and the control program 21 retires from the conference, the effectuation floor qualification currently assigned to the control programs 21 is transferred to a control program 21 of another workstation, thereby preventing an occurrence of a case where some resources cannot be assigned to the effectuation floor qualification. For this purpose, when the virtual input data is a disjoining command (step 280), the effectuation floor qualification EFF(APid, RSCid) is checked for all pairs of the AP identifier 43 and the resource identifier 44 such that any effectuation floor qualification assigned to the control program 21 are passed to a control program of the next workstation 21 (step 285). When the effectuation floor qualification transfer is thus completed, a value "0" is set to the effectuation floor qualification EFF(APid, RSCid) field for each pair of the AP identifier 43 and the resource identifier 44 in the control table 46 (step 290). Resultantly, the workstations disjoined from the conference are provided with the respective effectuation floor qualification for all associated resources so that each workstation freely operates in an independent manner in the operation environment thus prepared. Thereafter, the control program 21 conducts a communication procedure for the disjoining command (step 295). When the virtual input data is a termination command issued in response to a selection of the "Termination" 215 from the menu 195 to terminate the conference (step 300), the respective control programs are set to be independent of each other such that a step 305 assigns the effectuation floor qualification for the associated resources to the respective control programs. Namely, a value "0" is loaded in the effectuation floor qualification EFF(APid, RSCid) field for each pair of the AP identifier 43 and the resource identifier 44 in the control table 46. As a result, the participants for which the conference is terminated are respectively assigned with the effectuation floor qualifications for the resource associated therewith. The control program 21 then accomplishes a communication procedure for the termination command (step 310). When the virtual input data is neither one of the joining, disjoining, and termination commands above, the communication control module 23 carries out a communication procedure depending on contents of the received virtual input data (step 315).

In the embodiments above, any one of the workstations constituting the conferencing system can receive the effectuation floor qualification transferred from another workstation to achieve the processing so as to change the state of received data from the ineffective state into the effective state. However, depending or kinds of workstations or levels of users attending the conference, possession of the effectuation floor qualifications for all resources or for particular resources or programs may be inhibited. Namely, on receiving the effectuation floor qualification from another workstation, such a workstation inhibited from possessing the qualification only relays the effectuation floor qualification to the next workstation.

FIG. 28 shows an example of the effectuation floor qualification control table 46 disposed in consideration of the effectuation floor qualification inhibition above. When compared with the control table 46 of FIG. 25, an additional entry "forbidden" may possibly be set as a value of tho effectuation floor qualification. In this embodiment, when "forbidden" is set to the EFF(APid, RSCid) field in the control table 46, the workstation associated with this entry is prevented from possessing the effectuation floor qualification with respect to the pertinent resource; moreover, the workstation is inhibited from delivering virtual input data.

Figure 29:
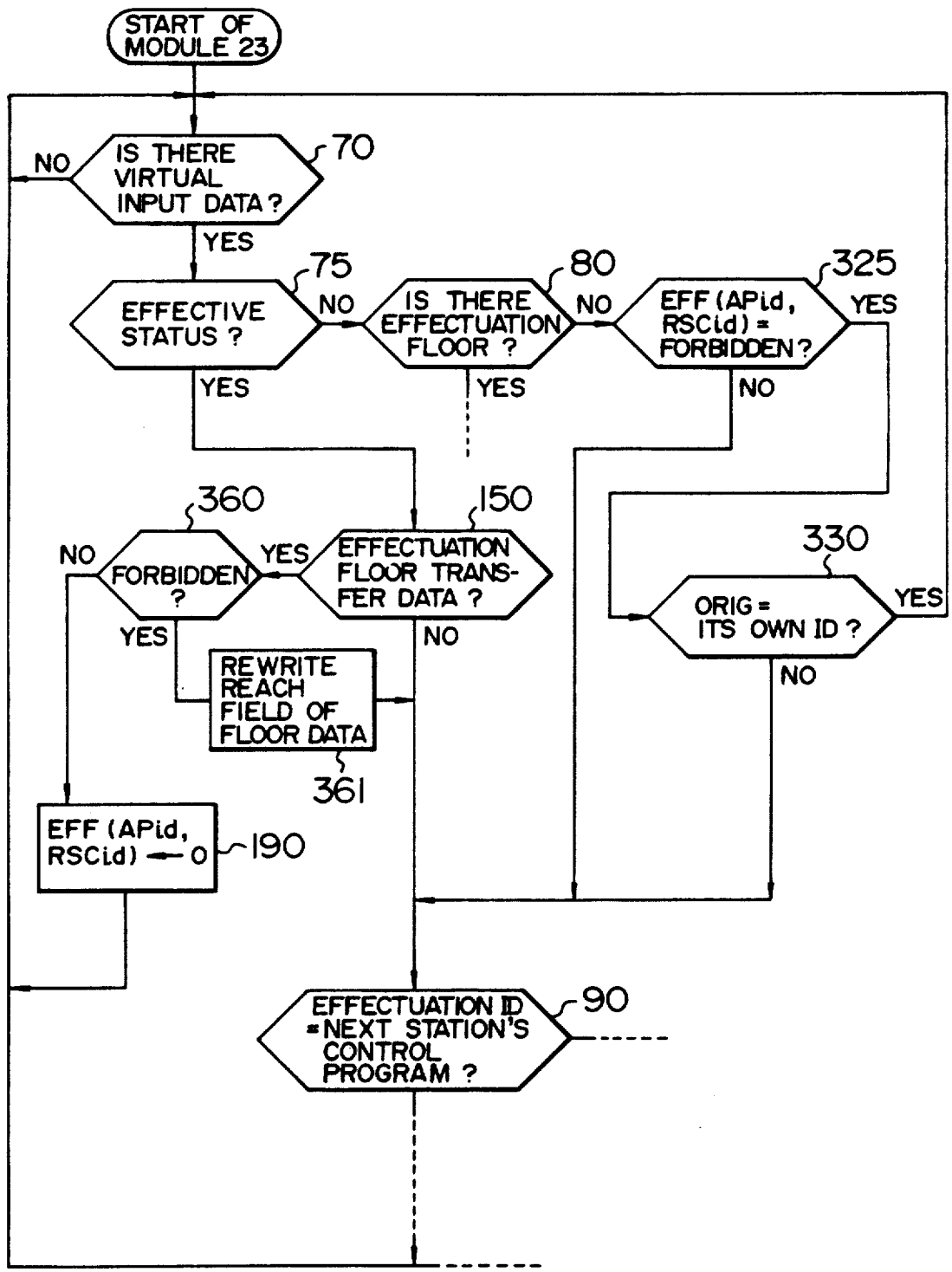
FIG. 29 is a flowchart for explaining the operation conducted by a communication control module in a case where a possession of the effectuation floor qualification can be inhibited.

FIG. 29 shows a flowchart of the procedure accomplished in the communication control module 23 when the effectuation floor qualification inhibition is taken into consideration. In this flowchart, the same portions as those of FIGS. 20 and 26 are omitted.

On receiving virtual input data (step 70), the module 23 checks the EFF field 41 of the data to determine whether or not the data is in the effective state (step 75). If the data is in the ineffective state, reference is made to the effectuation floor qualification control table 46 to decide whether or not the own workstation has the effectuation floor qualification for the virtual input data (step 80). If this is the case, the communication control module 23 carries out the same operation as those shown in FIGS. 20 or 26. Otherwise, a check is made to determine whether or not the own station is inhibited from possessing the effectuation floor qualification for the virtual input data, namely, EFF(APid, RSCid)='- 'forbidden" (step 325). If the judgement results in NO, control is passed to the step 90; otherwise, the module 23 checks to determine whether or not the originator (ORIG) of the virtual input data is identical to the identifier of the own control program 21 (step 330). If this is not the case, the processing proceeds to the step 90, whereas for ORIG="Own identifier", control is transferred to the step 70. Namely, the module 23 ignores input data related to a resource for which the effectuation floor qualification possession is inhibited.

The virtual input data judged to be effective in the step 75 is checked by a step 150 to determine whether or not the data is issued for an effectuation floor qualification transfer. If this is the case, in this embodiment, the control table 46 is referenced to decide whether or not "forbidden" is loaded in the EFF(APid, RSCid) field associated with the input data (step 360). If "forbidden" is not found in the field, the module 23 achieves processing to receive the effectuation floor qualification (step 190); otherwise, an identifier of a control program of the next station is loaded in the REACH field 42 of the effectuation floor qualification transfer data, thereby passing control to the step 90. As a result, the effectuation floor qualification transfer data is registered to be transmitted to the next station.

In the embodiments mentioned above, the conferencing system includes humans as participants, which however does not restrict the present invention. Namely, the present invention is also applicable to an operation in which interaction programs controlling machines and the like are cooperatively controlled under the control programs. More concretely, the prevent invention can be applied to a case where the participants are persons and to a case where the conferencing system includes only participants other than humans.

As described in detail above, in the data processor according to the present invention, input data items supplied from the respective participants are accumulated in the system such that the data items are sequentially passed through terminals of the participants so as to be set to the effective state by a control program (terminal) having the effectuation floor qualification. With this provision, an arbitrary number o participants of the conferencing system are allowed to conduct operations at any points of time, which as a result leads to an advantage of removing the fear that operation result data may be lost in the system.

In addition, data items set to the effective state by a participant having the effectuation floor qualification are received in an identical order by all control programs (terminals). This results in an advantageous feature that the same processing results are produced from object programs (interaction and utility programs) and hence the inconsistency does not appear between the terminals.

Moreover, in accordance with the present invention, the effectuation floor qualification is naturally moved to a participant frequently generation input data due to the characteristic of the conferencing system. Namely, the conventional operation to explicitly move the floor between control programs is unnecessitated, which resultantly leads to an advantage that the system load is reduced by removing the operation conventionally required to move the effectuation floor qualification.

As many apparently widely different embodiments of the present invention can be made without departing from the spirit and scope thereof, it is to be understood that the invention is not limited to the specific embodiments thereof except as defined in the appended claims.

We claim:

1. A joint information processing system, including a plurality of terminal stations connected to each other via a communication network, wherein each of said terminal stations comprises:

input means for inputting at least one of data and commands for information processing;

a communications interface connected with said communication network for transmitting data and/or commands to and receiving data and/or commands from said communication network;

data process means coupled to said input means and said communication interface for performing data processing operations for at least one of input data and input commands supplied from said input means and said communication network; and display means coupled with said data process means for displaying a result of data processing performed by said data process means;

said data process means including:

(a) storing means for storing status information indicating whether the terminal station possesses an effectuation floor qualification which is assigned to only one of said plurality of terminal stations;

(b) control means, operative in response to status information stored in said storing means, for setting data and/or commands received from said input means into an ineffective state and supplying said data and/or commands to said communication interface when said status information indicates possession of no effectuation floor qualification by the terminal station, and for supplying said communication interface with input data and/or input commands received from said input means and said communication network after converting said data and/or commands into an effective state when said status information indicates possession by the terminal station of the effectuation floor qualification; and (c) means for executing data processing operations for input data and/or commands only when the input data and commands are in an effective state.

2. A system according to claim 1, wherein said control means in each of said terminal stations includes means operatively connected to supply said communication interface with a control command for transferring the effectuation floor qualification to another terminal station in conformity with a predetermined condition and to update the status information stored in said storing means after the transferring of the effectuation floor qualification.

3. A system according to claim 1, wherein said data process means in each terminal station includes memory means for storing application programs for conducting data processing operations respectively associated with the input data and/or commands; and said control means comprises:

(i) means for appending an identifier to input data and input commands received from said input means for specifying an application program stored in said memory means; and (ii) means for distributing input data and input commands received from said input means and said communication network, when the input data and commands are in the effective state, to an application program specified by the identifier attached to the received data and commands, thereby to execute the program.

4. A joint information processing system, including a plurality of terminal stations connected to each other via a communication network, wherein each of said terminal stations comprises:

input means operated by a user to input data and/or commands;

communication interface means connected to said communication network for receiving data and/or commands from another one of said terminal stations and for transferring the data and/or commands to said other one of said terminal stations;

data process means coupled to said input means and said communication interface means for executing predetermined data processing operations using application programs for input data and/or input commands supplied from said input means and said communication interface means; and display means coupled with said data process means for displaying a result of data processing conducted by said data process means;

said data process means including:

(a) means for receiving data and/or commands from said input means;

(b) means for selectively distributing data and commands to said application programs; and (c) communication control means operatively connected to receive input data and/or commands from said receiving means and said communication interface means and to selectively supply input data and/or commands to said distribution means and said communication interface means;

said communication control means having:

(i) first means for storing information to indicate whether said terminal station possesses an effectuation floor qualification to set data and/or commands into a particular category; and (ii) second means operatively connected to said first means, for adding a status identifier to received input data and commands when the information stored in said first means indicates that said terminal station has an effectuation floor qualification for input data and commands and when said received input data and commands are in an ineffective state, said status identifier denoting that the input data and commands are in the effective state, and for thereafter delivering the resultant data and commands with the added status identifier to both said communication interface means and said distributing means, and for delivering received input data and commands with no status identifier to said communication interface means when said information indicates that the terminal station has no effectuation floor qualification for the input data and commands;

said data processing means in each terminal station operating so that only the input data and commands having a status identifier added thereto are subjected to data processing for joint information processing.

5. A system according to claim 4, wherein:

said terminal stations are interconnected to each other via a logical circular path formed by said communication network under control of said communication control means and only one of said terminal stations temporarily possesses the effectuation floor qualification at any time; and said communication control means in each terminal station includes means responsive to a status satisfying a predetermined transfer condition for generating a control command for a terminal station to pass the effectuation floor qualification to another one of said terminal stations on said logical circular path and for transmitting the control command to said communication network through said communication interface means.

6. A system according to claim 4, wherein said terminal stations are interconnected to each other via a logical circular path formed by said communication network under control of said communication control means; and said first means in each terminal station stores information for indicating the presence or absence of a plurality of effectuation floor qualifications, each associated with a predetermined category, each effectuation floor qualification being temporarily possessed by a respective one of said terminal stations;

said communication control means in each terminal station including means responsive to a status satisfying a predetermined transfer condition for anyone of said effectuation floor qualifications possessed by a terminal station for generating a control command for passing an effectuation floor qualification to another one of said terminal stations on said logical circular path and for transmitting the control command to said communication network through said communication interface means.

7. A conferencing system, including a plurality of terminals connected to each other via a network, wherein each terminal comprises:

input means for inputting commands;

communication means, connecting said plurality of terminals to each other to form a logical circular path in said network, for transmitting commands to a particular one of said terminals on a downstream side thereof, and for receiving commands from a particular one of said terminals on an upstream side thereof;

data process means, connected to said input means and said communication means, for processing commands inputted from said input means and said communication means; and display means, connected to said data process means, for displaying a result of data processing conducted by said data process means;

said data process means including:

first means operatively connected to receive input commands from said input means, for adding a header to each command inputted from said input means, said header having a field including a first status information designating whether the command is ineffective;

second means operatively connected to receive commands from said first means and said communication means, for setting second status information into the header of each ineffective command received from said first means and said communication means, when an effectuation floor qualification is assigned to the terminal associated with the data process means, to convert the command to an effective command, and for thereafter delivering the converted effective command to said communication means to transmit said command to other terminals;

third means, operatively connected to receive commands from said second means and responsive only to commands having a header which includes second status information, for executing a data processing program related to the command;

said second means operating to deliver ineffective commands received from said first means and said communication means to said communication means without adding the second status information to the header of each command, whereby ineffective commands are transmitted from station to station by said communication means without being executed by the data process means in the respective stations until the ineffective commands arrive at a terminal possessing the effectuation floor qualification and are converted to an effective command therein.

8. A system according to claim 7, wherein:

said first means sets into the header of each command an identifier of a program to be executed in response to the command, an identifier of a resource to be used by the program, and an identifier of a source generating the command; and said second means determines the presence or absence of the effectuation floor qualification with respect to a category specified by the program identifier and the resource identifier in the header of the command.

9. A data processing method for use in a conferencing system including a plurality of terminals connected to each other via a network in which each of the terminals is assigned with a data reception partner and a data transmission partner to form a logical circular path on the network, the method comprising the steps of:

assigning an effectuation floor qualification to one of the plural terminals;

inputting data and/or a command by an operator at any one of said terminals;

circulating the data and/or command from said one of said terminals at which the data and/or command is inputted to a next terminal at a subsequent position on the circular path as ineffective data and/or a command without executing a data processing program associated with the input data and/or command if said one terminal does not possess the effectuation floor qualification;

adding in the next terminal, when the next terminal possesses the effectuation floor qualification, information for converting the ineffective data and/or command received from the network to an effective state and circulating the converted data and/or command to a further next terminal on the circular path;

transmitting, when the next terminal does not possess the effectuation floor qualification, the data and/or command received from the network to the further next terminal on the circular path without making any change in the ineffective status of the data or command; and executing in each of the terminals a data processing program in response to a converted data and/or command to which information denoting an effective state has been added.

* * * * *